(12) United States Patent
Levi et al.

(10) Patent No.: US 12,303,969 B1
(45) Date of Patent: May 20, 2025

(54) MOLD COMPOSITIONS FOR ADDITIVE CASTING OF METAL OBJECTS

(71) Applicant: Magnus Metal Ltd, Revadim (IL)

(72) Inventors: Roi Levi, Rehovot (IL); Orel Birodker, Gan Yavne (IL); Valeriya Frid Zaid, Tel Aviv-Jaffa (IL); Hana Arini Yadid, Gedera (IL); Moshe Frenkel, Jerusalem (IL); Hani Farran, Ramat Gan (IL)

(73) Assignee: MAGNUS METAL LTD, Tzora (IL)

( * ) Notice: Subject to any disclaimer, the term of this patent is extended or adjusted under 35 U.S.C. 154(b) by 0 days.

(21) Appl. No.: 18/658,391

(22) Filed: May 8, 2024

(51) Int. Cl.
| | | |
|---|---|---|
| *B22C 1/02* | (2006.01) | |
| *B22C 1/18* | (2006.01) | |
| *B33Y 70/10* | (2020.01) | |
| *C04B 35/488* | (2006.01) | |
| *C04B 35/63* | (2006.01) | |

(52) U.S. Cl.
CPC .............. *B22C 1/02* (2013.01); *B22C 1/188* (2013.01); *B33Y 70/10* (2020.01); *C04B 35/4885* (2013.01); *C04B 35/6309* (2013.01); *C04B 35/6316* (2013.01); *C04B 2235/3217* (2013.01); *C04B 2235/3244* (2013.01); *C04B 2235/3427* (2013.01); *C04B 2235/422* (2013.01); *C04B 2235/447* (2013.01); *C04B 2235/528* (2013.01); *C04B 2235/5427* (2013.01); *C04B 2235/5436* (2013.01); *C04B 2235/5472* (2013.01); *C04B 2235/6026* (2013.01); *C04B 2235/9676* (2013.01)

(58) Field of Classification Search
CPC ........... B22C 1/02; B22C 1/188; B33Y 70/10; C04B 35/4885; C04B 35/6309; C04B 35/6316; C04B 2235/3217; C04B 2235/3244; C04B 2235/3427; C04B 2235/422; C04B 2235/447; C04B 2235/528; C04B 2235/5427; C04B 2235/5436; C04B 2235/5472; C04B 2235/6026; C04B 2235/9676

See application file for complete search history.

(56) References Cited

U.S. PATENT DOCUMENTS

| | | |
|---|---|---|
| 3,637,412 A | 1/1972 | Felice et al. |
| 5,536,686 A | 7/1996 | Chung |
| 2010/0029463 A1 | 2/2010 | Lipinski et al. |
| 2015/0246387 A1 | 9/2015 | Bartels et al. |
| 2020/0269320 A1 | 8/2020 | Ben-Zur et al. |

FOREIGN PATENT DOCUMENTS

| | | | |
|---|---|---|---|
| CN | 112545066 A | * | 3/2021 |
| CN | 117923909 A | * | 4/2024 |
| EP | 2014392 A2 | | 1/2009 |
| SU | 737386 A1 | | 5/1980 |
| WO | 2019/053712 A1 | | 3/2019 |
| WO | 2021/015626 A1 | | 1/2021 |
| WO | 2022/243921 A1 | | 11/2022 |
| WO | 2023/002468 A1 | | 1/2023 |
| WO | 2024/100642 A1 | | 5/2024 |
| WO | 2024/100643 A1 | | 5/2024 |
| WO | 2024/100644 A1 | | 5/2024 |

OTHER PUBLICATIONS

Zircon Industry Association, "Zircon, zirconia and zirconium—what's the difference?", retrieved from the Internet Dec. 5, 2024, 3 pages, Publisher: Zircon Industry Association, London, UK. URL: https://www.zircon-association.org/difference-between-zircon-zirconia,zirconium.html.

Chen et al., "Study on aluminum phosphate binder and related Al2O3 SiC ceramic coating", Materials Science and Engineering, 2003, pp. 29-35, vol. 348, Issues 1-2. https://doi.org/10.1016/S0921-5093(02)00643-3.

* cited by examiner

*Primary Examiner* — Anthony J Green

(74) *Attorney, Agent, or Firm* — Vorys, Sater, Seymour and Pease LLP; Anthony P. Venturino; Maryellen Feehery Hank

(57) ABSTRACT

The disclosure concerns printable refractory compositions, more particularly ceramic-based pastes for 3D printing of molds for additive metal casting. In particular, the present disclosure concerns composition for forming mold regions having controlled thermal conductivity and dissipation and controlled release of gaseous products therefrom during heating to mitigate mechanical failure risks in an additive casting process of metal objects.

20 Claims, 10 Drawing Sheets ered herein by reference. The
MOLD COMPOSITIONS FOR ADDITIVE CASTING OF METAL OBJECTS

TECHNOLOGICAL FIELD

The present disclosure concerns printable refractory compositions, more particularly ceramic-based pastes for 3D printing of molds for additive metal casting.

BACKGROUND ART

References considered to be relevant as background to the presently disclosed subject matter are listed below:
  US patent application publication no. 2015/0246387
  PCT patent application publication no. WO2019053712
  PCT patent application publication no. WO2022243921
  PCT patent application publication no. WO2023002468
  US patent application publication no. 2020/269320
  PCT patent application no. PCT/IL2022/051191
  European patent publication no. EP2014392
  PCT patent application publication no. WO2021015626

Acknowledgement of the above references herein is not to be inferred as meaning that these are in any way relevant to the patentability of the presently disclosed subject matter.

BACKGROUND

Casting is one of the oldest material-forming methods still used today. The principal process had not changed since 3200 BC when bronze was melted and poured into a stone mold. Metal casting is defined as the process in which molten metal is poured into a mold that contains a hollow cavity of a desired geometrical shape and allowed to cool down to form a solidified part.

Most of the world's demand for metal casts is addressed nowadays by traditional casting techniques. While automation solutions are applied, traditional casting involves the global production of molds and the global application of molten metal. For example, additive manufacturing techniques are used for mold fabrication with the implementation of mold curing, sintering, or otherwise mold curing (partially or fully) as a global operation before metal pouring. Molten metal is poured into fully fabricated molds.

Currently available metal additive manufacturing technologies address complex design and low volume applications of relatively small-size parts. Scaling from small parts to large parts of hundreds and thousands of kilograms is not trivial. In several currently available metal additive manufacturing technologies, size and weight scaling-up involves part deformation, distortion, shrinking, fracture, cracking, and more.

In some technologies for additive manufacturing of metal object, ultra-thin layers of mold composition are deposited. Due to the small dimensions of the layers, production of large metal object is a lengthy and costly process. Such thin layers prevent casting of large volumes of metal in each casting cycle.

Despite the advantages of metal additive manufacturing, the associated high cost, low throughput, and scaling-up challenges prevent the adoption of additive techniques for widespread industrial use, especially for manufacturing iron and steel parts.

Casting is widely used for industrial manufacturing of large production quantities and sizable parts in a one-piece cast. Metal casting can produce complex shapes and features like internal cavities or hollow sections can be easily formed. Materials that are difficult or expensive to manufacture using other manufacturing processes can be cast. Compared to other manufacturing processes, existing casting is cheaper for medium to large metal quantities, especially for iron and steel casting.

Modern metal casting also has several disadvantages. Patterns and molds are time-consuming and expensive to manufacture. Additive manufacturing processes, such as binder jetting, are typically used to create patterns and molds. However, the fabrication of patterns and molds extend the lead time and limit design flexibility for modifications and adaptations. Additionally, minor post-processing or significant additional post-processing operations are needed for certain applications. Furthermore, metal casting is a hazardous activity, as it involves many elements such as furnaces, molds, cooling areas, and additional tooling that are manually operated and exposed, while operating at very high temperatures.

An example of a system and method for additive metal casting is described in PCT patent applications publication numbers WO2019053712A1, WO2023002468 and WO2022243921A1 assigned to the assignee of the present application, which are incorporated herein by reference. The method described therein includes depositing a first portion of a mold (mold region), pouring liquid substance into the first portion of the mold to form a first casted layer (object region), solidifying at least a portion of the first casted layer, depositing a second portion of the mold on top of the first portion of the mold, pouring the liquid substance into the second portion of the mold to form a second casted layer on top of at least a portion of the first casted layer, and solidifying at least a portion of the second casted layer. Thus, in a sequential manner, a stack of production layers is produced on a building table, each production layer is composed of a mold region and an object region. The mold region may be constructed in-situ, by mold paste deposition, or ex-situ, by placing remotely-fabricated mold region frames. The object region is produced by depositing molten metal into the mold region, one production layer after the other.

GENERAL DESCRIPTION

In the additive casting process, namely in a casting-in-layers process, a metal object region is cast in each production layer by depositing molten metal into a cavity defined by a mold region. A layer of mold composition (typically in paste form) is first deposited according to a pre-defined pattern to form a mold region, at least partially cured, and then molten metal is cast into the cavity defined by the mold region to obtain an object region that is laterally encased by the mold region. The deposited molten metal is then permitted to partially cool and solidify, thereby allowing subsequent deposition of an ensuing layer of mold composition.

Thus, the casting-in-layers process includes deposition cycles, in each cycle a mold region and a metal object region are formed to define together a production layer, followed by subsequent deposition cycles, until the entire desired object is obtained. In other words, a continuous sequence of deposition cycles is carried out, in each cycle a mold region is deposited first, followed by casting of a metal object region, to obtain a stack of production layers which result in a combined mold-metal layered structure.

Typically, the subsequent cycles of mold-object deposition involve repeated exposure to heating cycles. The mold regions, which define the cavities into which the molten metal is cast, are exposed to a sequence of thermal shocks at various temperature profiles, resulting from the contact with the molten metal and the dissipation of heat into the mold regions during and subsequent the deposition of the metal object region. Additional thermal shocks may be affected by pre-deposition and post-deposition heating of the deposited metal object regions to define its properties, e.g. metallurgical properties. Further, as the already-cast metal expands and contracts with each deposition of a new metal thereonto, the thermal shock cycles are also accompanied by repeated mechanical stressing of the mold regions due to expansion and contraction of the metal associated with changes in temperatures at the metal object region.

The heat provided to the metal object region is associated with the deposition of molten metal, the heating of the previously-cast metal (pre-deposition heating) and the heating of the currently-cast metal object region (post deposition heating). A specific metal object region experiences repeated heating cycles associated with its casting, as well as casting of subsequent, upper object regions. The metallurgical properties, mechanical properties and other properties are affected by the above-described heating cycles. In other words, metal properties are affected by heating and reheating, up to melting, of cast residing in the current and previous mold regions. Without wishing to be bound by theory, the dissipation of heat from the metal object region to the mold region does not play a significant part in affecting metal properties. The mold region of the current and previous production layers experience repeated heat cycles, and in order to maintain their mechanical integrity, the mold regions should be designed to withstand heat cycles.

Hence, the mold region is typically formed out of compositions comprising refractive ceramic materials, special binders that can withstand the high temperatures to which the mold is exposed to, and various additives that increase the thermal and mechanical stability of the mold region to repeated thermal and mechanical shocks. Such compositions are typically expensive, and therefore there is a requirement to reduce the amount of mold composition used for cost-efficiency of the additive casting process.

The present disclosure provides paste compositions that can be deposited to form mold regions having controlled gaseous products release rate and improved heat absorbance/conductance, such that once in contact with the metal at various temperatures, can function to provide mechanically stabilized mold regions, heat dissipation through the mold region and reduced risk of mechanical failure when exposed to various heat cycles. In other words, the paste compositions of this disclosure are characterized by controlled energy absorbance and conduction, as well as controlled gas release during their polymerization and drying, thereby enabling obtaining mold regions that reach thermal and mechanical stability relatively fast with reduced risk of mechanical failure.

The paste compositions of this disclosure are designed to have controlled energy absorption and dissipation. This permits for effective energy uptake of heat to which the mold region is exposed (e.g. from the surroundings, from the molten metal, etc.), and effective heat dissipation within the voluminous mold region to minimize the thermal shock experienced by the mold region during various stages of casting. In addition, efficient and controllable gas release from the paste composition during absorption of such heat enables minimizing the mechanical damage to the mold region that can be formed due to uncontrolled and abrupt gas release from the mold region (e.g. due to boiling liquid or gaseous chemical reaction products), hence, maintaining the mechanical integrity of the mold (and particularly the metal-mold interface) during casting.

While in traditional mold manufacturing techniques, typically based on ceramic compositions, entire molds or mold layers are deposited and then fully sintered before deposition of molten metal, in the presently disclosed additive casting process the mold regions are designed to function in a non-sintered state, typically as a green body (as will be further explained below). Working with green body mold regions enable significant reduction in production time and energy consumption, as full sintering is not required. However, working at a green body state involves significant challenge, as when in the greed body state, the mold region is significantly more sensitive to thermal and mechanical impacts compared to a sintered state. Thus, there is importance to proper designing of compositions that would provide improved mechanical stability of the mold regions during additive manufacturing and the exposure to repeated thermal and mechanical shocks.

Further, unlike other additive processes, in which thin (or even ultra-thin) layers of mold are formed (for example by binder-jetting mold manufacturing, or additive mold-metal manufacturing as described in US2020269320), the additive processes disclosed herein is designed for casting of relatively large metal objects, and are hence designed to enable formation of voluminous mold regions. In other words, the paste compositions of this disclosure are designed to provide mechanical support for relatively thick and voluminous mold regions, thereby providing sufficient mechanical support for casting-in-layers of large metal objects and minimizing mechanical failure of the mold regions during the additive casting process.

Working with thick or voluminous mold regions possess several challenges, mostly relating to heat distribution and transfer into the mold region that have detrimental effect on the mechanical stabilization of the mold region (e.g. the rate and extent of polymerization and/or drying), as well as stress loading applied onto the mold region due to repeated expansion of the object region during repeated heating and cooling of the metal therein, making the design of the mold compositions critical.

The pastes of the present disclosure aim at addressing these challenges. The present disclosure provides paste compositions suitable for providing voluminous, mechanically stable mold regions, designed for additive casting to form metal objects by the cycled mold-metal regions deposition methods described herein. The paste compositions are designed to permit effective heat dissipation through the bulk of the mold region, as well as controlled gas release from the paste as to optimize drying and minimize mechanical damage to the mold region, thereby reducing the risk of mechanical failure of the mold due to the aggressive metal-casting conditions and the risk of leakage of the molten metal during additive casting.

It is noted that in the context of the present disclosure, additive metal casting refers to cycles of fabricating production layers. In the context of the present disclosure, the production layer includes one or more mold regions each defining and surrounding a respective metal object region. The mold regions are typically in a closed-loop geometry, each mold region of a production layer defining a cavity into which molten metal is cast to obtain the object region of the production layer. After the stack of production layers is fabricated, a combined mold-metal structure is obtained, following which the mold is removed, e.g. by using known mold removal techniques, and the desired metal object is obtained.

It is to be noted that, typically, the lowermost, base layer of the mold is made solely out of the mold material, and is typically continuous (i.e. without forming a cavity therein), as to form a uniform, continuous base onto which a sequence of production layers is formed. However, it is to be understood that at times, depending on the desired mold geometry, that no such base layer is needed.

Thus, in the description below, the term mold region will refer to the mold part/portion within the single production layer. The mold region in each production layer can be a single monolithic layer formed out of a mold composition. Alternatively, the mold region in a production layer can be formed from a stack of sub-layers, together defining a multi-layered mold region. For example, the mold region a production layer can be composed of several (e.g. 2-5) sub-layers (print-lines) of mold compositions that are continuously deposited one on top of the other in order to form the mold region of the production layer before deposition of the into the cavity defined thereby.

In some configurations, the mold region in each production layer is a single monolithic layer of the paste composition. According to other configurations, the mold region in each production layer comprises at least 2, typically between 2 and 5, sub-layers (print-lines) of the mold composition. According to some other configurations, the mold region in some of the production layers are each a single monolithic layer of the mold composition, while the mold regions in the rest of the production layers are structured from sub-layers of the mold composition.

For illustration, in a specific non-limiting example, molten metal additive casting of gray iron objects is formed out of a stack of production layers (e.g. 4-100 production layers or more), each of 2-20 mm height. In an exemplary construction, a production layer can be formed from a mold region of 8 mm height, which can be a monolithic deposition of mold composition in the form of solid paste cylinders with average cross-section of 8 mm; alternatively a mold region of 8 mm height can be constructed by depositing 4 mold sub-layers, each of 2 mm height. The corresponding object region may have the same height-8 mm (or less), and may be fabricated by a single depositing of 8 mm of metal, by several subsequent depositions within a manufacturing cycle of the fabrication layer, e.g. two consecutive depositions of metal, each 4 mm in height. In other words, the mold region in each production layer can be formed out of one or more print lines, defining the height of the mold region in the production layer. The resultant mold region is therefore voluminous to withstand the thermal and mechanical shock exerted by introduction of molten metal into the cavity defined by the mold region, and designed to receive molten metal of a corresponding height.

The terms mold or mold structure will refer to all or part of the stack of mold regions in all or several production layers.

The geometry of the mold regions is dictated by the geometry of metal object region to be cast, according to the geometry of the final metal object to be manufactured. Therefore, the mold regions of different production layers may or may not be of the same size and geometry.

The term metal means to denote any metals and/or mellitic alloys which are suitable for melting and casting, for example, ferrous alloys (gray iron, ductile iron, compacted graphite iron (CGI), steel, titanium, etc.), non-ferrous allows (nickel-chromium-based superalloys, e.g. Inconel), aluminum alloys, copper alloys, nickel alloys, magnesium alloys, and the like.

According to one of its aspects, the disclosure provides a paste composition for manufacturing of a mold for additive casting of a metal object, in a process of subsequent formation of production layers, each production layer comprising at least one mold region and at least one metal object region, the mold region comprising at least one paste composition, the paste composition comprising:
at least one ceramic material in particulate form;
at least one inorganic binder;
at least one porosity controlling additive;
at least one of an energy absorbing additive and an energy conductive additive; and
at least one carrier liquid;
the paste composition having a mass loss of at least about 10 wt % out of the total mass of the paste composition when heated to about 220° C. for a period of time of no more than about 30 minutes.

In the context of the present disclosure, the term mass loss will refer to decrease in total mass of the paste composition when heated to about 220° C. for a period of time of no more than about 30 minutes. Unless specifically noted otherwise, the mass loss is measured as the total mass loss from a layer of deposited paste composition of a sample having a surface area to volume ratio of at least 1.5:1, typically between 2:1 and 3:1 [$cm^2/cm^3$] at an energy flux of about 25 KW.

According to some embodiments, the paste composition has a mass loss of at least about 10 wt % out of the total mass of the paste composition when heated to about 220° C. for a period of time of no more than about 25 minutes.

According to some embodiments, the paste composition has a mass loss of at least about 10 wt % out of the total mass of the paste composition when heated to about 220° C. for a period of time of no more than about 20 minutes.

According to some embodiments, the paste composition has a mass loss of at least about 10 wt % out of the total mass of the paste composition when heated to about 220° C. for a period of time of no more than about 15 minutes.

According to some embodiments, the paste composition has a mass loss of at least about 10 wt % out of the total mass of the paste composition when heated to about 220° C. for a period of time of no more than about 10 minutes.

In the present disclosure, as described herein, each production layer is manufactured by deposition of at least one said paste composition to form the mold region, drying the mold region, and deposition of molten metal into a cavity defined by the mold region to obtain the metal object region.

The paste composition provides effective energy (e.g. heat) transfer through the mold region (for example, heat introduced from the environment when applying heating conditions, from the metal region to the mold region, etc.), and effective heat dissipation therethrough. Further, as the composition is in paste form, heating thereof forms gaseous products (e.g. vapors of the carrier liquid, volatile components and/or gaseous reaction products). In order to minimize mechanical failure due to uncontrolled release of such gaseous products from the bulk of the mold region, the paste composition is characterized by providing controlled gas release therefrom, as will be explained below, thereby maintaining mechanical integrity of the mold region, and particularly at the interface between the mold region and the metal region.

The term porosity controlling additive refers to one or more components that increase the porosity of the paste composition. The porosity controlling additive can be, for example a porous powdery additive, substantially hollow particles, a powdery additive having a large surface area, a sacrificial material or a pore-forming material that decomposes upon heating to form porosity, etc.

By controlling the porosity of the paste composition, control over the release of gaseous products from the bulk of the paste is obtained. Controllably increasing the porosity of the paste composition results in an interconnected network of spaces or channels within the paste composition that provide locations for gas expansion and gas evacuation from the bulk towards the surface of the mold region.

In some embodiments, the at least one porosity controlling additive is a pore-forming material, either as foaming agents or as sacrificial materials, which decompose when heated to form a pore. For example, the pore-forming material can be a foaming surfactant (e.g. sodium dodecyl sulfate), calcium bicarbonate, sodium bicarbonate, an organic compound or composition having a suitable decomposition temperature (e.g. polystyrene beads), etc. Alternatively, the pore-forming material can be a compound that reacts with water to form gaseous products that can be captured as bubbles in the paste.

In some embodiments, the at least one porosity controlling additive are one or more types of microspheres. Microspheres are highly rounded spherical micronic particles, solid or hollowed (hollow microspheres are sometimes also referred to as microballoons). When in solid form, the microspheres are typically porous or have a porous (or highly irregular) surface. The inventors have surprisingly found that in paste compositions of this disclosure, in addition to increasing the overall porosity, the microspheres function to provide balance and control over the gaseous products evacuation from the paste during drying. Without wishing to be bound by theory, by forming paths for gaseous products release, porosity prevents internal pressure buildup during drying of the paste (which is carried out by applying heating conditions or in response to heat associated with heating the metal during casting). Further, by temporarily physi-sorb molecules of the carrier liquid, e.g. water, a delay in moisture and/or the rate of vaporization of the carrier liquid from the paste composition can be obtained, thereby assisting in preventing rapid shrinkage and/or capillary collapse. Therefore, the microspheres assist in controlling the rate of vaporization of the liquid carrier and other volatile compounds from the paste composition when exposed to elevated temperatures in the additive casting process. Such controlled release of vapors reduces the risk of cracking or popping effects at the bulk of the mold region as well as at its surface.

By some embodiments, the microspheres have particle size of no more than about 500 μm, typically between about 50 and 500 μm. According to some embodiments, the microspheres have a particle size of no more than about 500 μm, typically between about 100 μm and 300 μm.

The term particle size refers herein to particle size determined by sieving through sieves with appropriate mesh numbers.

According to some embodiments, the microspheres are made of glass, ceramic material, polymeric materials (e.g. phenolic microspheres), metallic materials, and mixtures thereof. The microspheres can be at least partially coated with a metal coating (e.g. silver, copper, etc.), for example ceramic microspheres coated by one or more metals. The microspheres can be at least partially coated with one or more hydrophilic coatings to increase their affinity to water molecules, thereby further assisting in controlling the rate of release of water molecules from the paste composition.

By some embodiments, the microspheres are made of aluminum oxide, aluminum silicate, silicon dioxide, borosilicate glass, yttria-stabilized zirconia, and mixtures thereof.

By some embodiments, the paste composition comprises between about 4 wt % and about 14 wt % of said microspheres, e.g. between about 5 wt % and about 10 wt %.

In order to provide improved and controlled energy absorbance and dissipation in the mold region, the paste composition comprises at least one of an energy absorbing additive and an energy conductive additive.

The term energy conductive additive refers to a compound or composition of matter that is capable of transiently absorbing energy, e.g. thermal energy (heat), and transmit (i.e. conduct) such energy therefrom to the surrounding environment. Hence, in the paste compositions of this disclosure, the energy conductive additive effectively absorbs heat introduced into the mold region, either from the environment (as a result of external heating) or from the metal region, and conduct it away from the metal-mold interface into the bulk of the mold region. Further, the energy conductive additive effectively transfers the thermal energy from the metal-mold interface and external face of the mold region and direct it into the bulk of the voluminous mold region. This, in turn, permits the heat-driven polymerization reaction of the inorganic binder within the bulk of the mold region, thereby polymerizing the binder and providing the mold region with mechanical stability.

The term energy absorbing additive means to denote a compound or composition of matter that is capable of absorbing energy, e.g. thermal energy. The use of energy absorbing additives in a paste composition of this disclosure permits effective heat absorbance from the environment and the metal-mold interface, thereby promoting heat dissipation within the bulk of the mold region.

The combination of energy absorbing and/or conductive additives together with the controlled porosity of the paste composition, was surprisingly found to strike a balance between the energy absorption that is required for the polymerization processes in the paste composition (in order to mechanically stabilize it to enable provision of mechanical support for the mold region) and the heat dissipation from the metal-mold interface that is required during the molten metal casting process in order to maintain the mold region's integrity. Further, this combination strikes another balance of heat conductance into the bulk of the mold region to effectively and quickly polymerize the binder and vaporize the carrier liquid from the mold region (i.e. dry the paste composition), however also maintaining control over the rate of gaseous products release from the paste composition during these processes in order to minimize abrupt gas/vapor release from the mold region that may hinder its mechanical integrity and have an impact on the integrity of the metal-mold interface.

The balance between energy absorption and conductivity, together with the careful control over the porosity of the mold region during drying, results in effective utilization and dissipation of the heat introduced into the mold region, however providing minimal stress development in the mold region, thereby minimizing and even preventing mechanical failure of the mold although providing a fast drying rate of the mold region. Such balance enables working at relatively quick fabrication cycles for the production layers utilizing voluminous mold regions, without risking mechanical failure of the mold.

In some embodiments, the paste composition comprises both an energy absorbing additive and an energy conductive additive. In some other embodiments, the energy absorbing additive and the energy conductive additive are the same materials.

In some embodiments, the energy absorbing additive is selected from carbon black, carbon powder, graphene, graphite, carbon nanotubes, UV-absorbing pigments, visible spectrum absorbing pigments, IR absorbing pigments, magnesium-aluminum oxides (e.g. spinel), ceramic fibers, and mixtures thereof.

By some embodiments, the paste composition comprises between about 0.05 wt % and about 3 wt % of said energy absorbing additive.

In some embodiments, said energy conductive additive is selected from carbon black, carbon powder, graphene, graphite, carbon nanotubes, boron nitride, carbon nitride, silicon nitride, silicon carbide, metal particles and/or fibers (e.g. copper, silver, iron, steel, gold, etc.), metal oxides, and mixtures thereof.

By some embodiments, the paste composition comprises between about 0.05 wt % and about 3 wt % of said energy conductive additive.

As noted, the paste composition comprises at least one inorganic binder. The term inorganic binder refers to a non-organic material or composition (i.e. carbon-free) which functions to bind the particles of the ceramic materials together to form the mold region. In other words, the inorganic binder forms a polymeric chain having an inorganic backbone. The binder acts through a combination of cohesive forces within the binder itself and adhesion to the ceramic material particles at the interface between the binder and the particles. As the additive casting of metal in which the paste compositions of this disclosure are utilized requires exposure of the paste composition to high temperatures, inorganic binders are utilized, that can withstand the process temperatures.

According to some embodiments, the at least one binder has a polymerization temperature of at least 150° C., typically between about 150° C. and about 850° C.

Unlike existing mold manufacturing processes, in which the entire mold is first produced, and typically sintered in order to obtain a rigid ceramic structure prior to casting of the entire metal object into the mold—in the additive casting processes in which the paste compositions of this disclosure are used, the mold region is not exposed to sintering conditions (which require a long exposure to high temperatures). It is to be noted that sintering is typically used in known mold manufacturing processes when thick or voluminous mold regions are formed/deposited in order to provide for a fully sintered mold before introduction of molten metal thereinto. Unlike existing mold manufacturing processes, the paste composition of this disclosure is designed to provide mechanical support to and heat conductance from the external surface of the mold region into its bulk, as to permit thick or voluminous mold regions (typically in the form of cylinders having an average diameter of 2-20 mm), to withstand the mechanical and thermal impacts exerted by the molten metal casting process, without requiring sintering the mold region, namely working with mold regions at a green body state. The term green body (or green body state) means to denote a state in which ceramic particles of the mold composition are held together by a binder after the binder has gone through at least partial polymerization. Unlike a sintered state, in which the binder is thermally decomposed and the ceramic particles are "fused" to one another to form a continuous, 3-dimensional ceramic structure, in the green body state the ceramic particles are not fused to one another, and hence the mechanical properties of the mold region are determined by the combination of ceramic material and the binder (at its at least partial polymerized state) and the interactions between them. Working at a green body state of the mold region is accompanied by significant reduction in overall energy consumption of the process, as no energy needs to be invested to first obtain a sintered mold region, while also saving significant process time (as typical sintering spans at least several hours).

Further, it is at times desired to carry out one or more surface treatments of the mold region before casting the molten metal, e.g. to smoothen the surface or to render the mold region with desired surface features, typically in portions of the mold regions that will be interfacing the molten metal (e.g. inner walls of the mold region). For example, such metal-facing surfaces may undergo surface shaping, material removal (e.g. of ceramic sags), surface smoothening, coating, etc. by a variety of processing techniques, such as milling, grinding, polishing, heating, coating and the like. Such processes are easier to be carried during a green body state, and are preferably carried out before complete polymerization of the mold region to reduce the risk of mechanical damage to the mold region. Therefore, selection of the inorganic binder of the paste composition to permit at least initial stabilization of the mold region enables the mold region to be sufficiently mechanically stabilized to permit such surface treatments.

By some embodiments, the paste composition comprises between about 3 wt % and about 8 wt % of said at least one inorganic binder.

By some embodiments, the at least one inorganic binder is selected from silicate-based binders, phosphate-based binders, aluminosilicate binders, alumino-silico-phosphate binders, magnesium oxide (MgO), colloidal silica, and mixtures thereof.

According to some embodiments, the at least one inorganic binder is at least one silicate-based binder. In such embodiments, the silicate-based binder can be an alkali-silicate, an earth-alkali silicate, or a combination thereof.

According to some embodiments, the silicate based binder is selected from sodium silicate, potassium silicate, colloidal silica, and mixtures thereof.

According to some embodiments, the at least one inorganic binder is at least one phosphate-based binder. In such embodiments, the phosphate-based binder can be selected from alkali metal trimetaphosphate (e.g. sodium trimetaphosphate, STMP), alkali metal monophosphate, aluminum phosphates, sodium tripolyphosphate, silico-aluminophosphate, monoaluminium phosphate, polyphosphates, dihydrogen aluminophosphate, polyphosphazene and mixtures thereof.

As the paste composition is typically designed for commercial, mass production additive casting processes, it is important that each manufacturing step will be time efficient. Depending on the heating technology, geometry of the deposited mold region, mass of deposited paste composition, and/or working conditions, the time duration to obtain at least partial polymerization of the paste composition in the mold region to permit it to be sufficiently stable for metal casting is no more than 30 minutes, preferably between about 1 minute and about 20 minutes, e.g. between about 1 minute to 10 minutes.

The term ceramic material means to denote a material or a composition which is neither metallic nor organic. Preferably, the ceramic material is selected to withstand the high temperatures exerted during the additive casting process, typically over at least 600° C., without undergoing substantive chemical changes or thermal decomposition. The ceramic material is typically in particulate form, i.e. powder. The particles can be crystalline, semi-crystalline, amorphous, or any blend thereof.

According to some embodiments, the at least one ceramic material is selected from zirconia ($ZrO_2$), alumina ($Al_2O_3$), silica ($SiO_2$), zirconium silicate, yttria-stabilized zirconia, carbides (silicon carbide, tungsten carbide, etc.), and mixtures thereof.

According to some embodiments, the at least one ceramic material is selected from zirconia ($ZrO_2$), alumina ($Al_2O_3$), and silica ($SiO_2$).

According to some embodiments, the paste composition comprises between about 65 wt % and about 75 wt % of said at least one ceramic material.

By some embodiments, in order to further facilitate control over the release of liquid carrier from the paste composition, at least a portion of particles of said ceramic material are at least partially coated by a hydrophilic coating. Namely, in such embodiments, particles of the ceramic material are at least partially coated by a coating that has affinity to water molecules. Similarly to the function of the microspheres described herein, such coating can function as a vaporization inhibitor, reducing and controlling the rate by which gaseous, typically vaporized water molecules, are released from the paste composition during boiling of the carrier liquid or during polymerization of the inorganic binder once the mold region is exposed to elevated temperatures.

By some embodiments, the ceramic material particles are porous, and/or have irregular surface. Such porosity or surface irregularity (e.g. high degree of surface roughness) can provide a further means for porosity control in the paste composition, as well as further vaporization inhibition for the gaseous products from the paste composition.

According to some embodiments, the ceramic material has a particle size of no more than about 300 μm. According to some other embodiments, the ceramic material has an particle size of between about 50 μm and about 300 μm.

Another means of controlling the overall porosity of the paste composition is tailoring the particle size of the ceramic material(s) to impact the packing of the particles in the paste composition. According to some embodiments, the at least one ceramic material is a mixture of at least one first ceramic material having a particle size of between about 50 μm and about 300 μm and at least one second ceramic material having a particle size of between about 1 μm and about 15 μm. In such embodiments, each of said first and second ceramic materials is independently selected from zirconia, alumina, silica, zirconium silicate, yttria-stabilized zirconia, silicon carbide, and tungsten carbide.

The term particle size refers herein to particle size determined by sieving through sieves with appropriate mesh numbers.

According to some embodiments, the weight ratio between the ceramic material and the inorganic binder in the paste composition is between about 4:1 and about 20:1, e.g. between about 8:1 and 16:1.

According to some embodiments, the weight ratio between the inorganic binder and the total of the energy absorbing additive and the energy conductive additive in the paste composition is between about 2:1 and about 100:1, e.g. between about 2:1 and about 50:1, or even between about 2:1 and about 20:1.

According to some embodiments, the weight ratio between the inorganic binder and the porosity controlling additive in the paste composition is between about 1:4 and about 2:1, e.g. between about 1:2 and about 2:1.

As noted, the paste composition comprises at least one carrier liquid, in which the other components of the paste composition are dispersed in order to obtain a paste consistency and homogeneity.

The liquid carrier is a liquid or a mixture of liquids that permits at least partial wetting and/or at least partial dispersion of the ceramic material, and typically has a boiling temperature of at most about 220° C.

According to some embodiments, the carrier liquid can be selected from water, $C_1$-$C_6$ alcohols, $C_5$-$C_{12}$ alkanes, mineral oils, natural oil, synthetic oils, and any mixture thereof.

According to some embodiments, the carrier liquid is water. The water can be, for example, tap water, filtered water, distilled water, ionized water, deionized water, sterile water, etc.

According to some embodiments, the paste composition comprises between about 10 wt % and about 20 wt % of said liquid carrier, e.g. between about 10 wt % and 18 wt % of said liquid carrier.

In some embodiments, the paste composition is configured to be printable; namely, to be deposited from a bulk container through a suitable nozzle. Hence the paste composition should have a viscosity suitable for such dispensing. However, the paste composition also needs to substantially maintain its deposited (printed) shape until sufficient polymerization is obtained. Hence, careful balance and control over the paste's viscosity needs to be maintained.

According to some embodiments, the paste composition has a viscosity of at least about 10,000 cps (centipois, or mPa·s), e.g. between about 15,000 cps and about 50,000 cps.

According to some embodiments, one or more flow modifiers can be added to the paste composition to obtain the desired viscosity and/or rheological properties. For example, plasticizers, surfactants, thixotropic flow modifiers, non-Newtonic flow modifiers, temperature-dependent rheology modifiers, etc.

The paste composition may comprise one or more additional components, rendering the paste composition with one or more functional features or improved properties.

Depending on the carrier liquid and the properties of the ceramic material and/or other components of the paste composition, surface active compounds or compositions can be used to maintain the solid components of the paste composition stably dispersed in the carrier liquid, at least for a pre-defined period of time (e.g. for pre-defined storage or during the additive casting process of a complete metal object). Thus, according to some embodiments, the paste composition further comprises at least one dispersant or surfactant. A surfactant (or a dispersant) is an agent that is capable of lowering the surface tension of a liquid, allowing for the formation of a homogeneous mixture of at least one type of liquid with at least one other type of liquid, or between at least one liquid and at least one solid.

According to some embodiments, the paste composition comprises between about 0.5 wt % and 3 wt % of at least one surfactant or dispersant.

In order to further increase the strength, i.e. directional strength, of the mold region, mechanical reinforcing agents can be added to the paste composition. The mechanical reinforcing agent can be in any suitable form, e.g. particles, flakes, discs, rods, short or long fibers, tubular particles, nanotubes, etc.

According to some embodiments, the paste composition can include one or more additional functional additives, such as releasing agents, polymerization activating/initiating agents (i.e. catalysts), UV absorbing agents, crosslinking agents, drying agents, etc.

By another aspect, there is provided a paste composition for manufacturing of a mold for additive casting of a metal object, in a process of subsequent formation of production layers, each production layer comprising at least one mold region and at least one metal object region, the mold region comprising at least one paste composition, the paste composition comprising:

between about 65 wt % and about 75 wt % of at least one ceramic material in particulate form;

between about 3 wt % and about 8 wt % of at least one inorganic binder;

between about 4 wt % and about 14 wt % of at least one porosity controlling additive;

between about 0.05 wt % and about 3 wt % of at least one of an energy absorbing additive and an energy conductive additive; and between about 10 wt % and about 20 wt % of at least one carrier liquid;

the paste composition having a mass loss of at least about 10 wt % out of the total mass of the paste composition when heated to about 220° C. for a period of time of no more than about 30 minutes.

By another aspect, the disclosure provides a paste composition for manufacturing of a mold for additive casting of a metal object, in a process of subsequent formation of production layers, the mold region comprising at least one paste composition, the paste composition comprising:

between about 65 wt % and about 75 wt % of at least one ceramic material in particulate form;

between about 3 wt % and about 8 wt % of at least one silicate-based binder;

between about 4 wt % and about 14 wt % of ceramic microspheres;

between about 0.05 wt % and about 3 wt % of an energy absorbing and conducting additive selected from carbon black, carbon powder, silicon carbide, aluminum nitride, boron nitride and silicon nitride, and mixtures thereof; and between about 10 wt % and about 20 wt % of at least one carrier liquid;

the paste composition having a mass loss of at least about 10 wt % out of the total mass of the paste composition when heated to about 220° C. for a period of time of no more than about 30 minutes.

By yet another aspect, there is provided a paste composition for manufacturing of a mold for additive casting of a metal object, in a process of subsequent formation of production layers, each production layer comprising at least one mold region and at least one metal object region, the mold region comprising at least one paste composition, the paste composition comprising:

between about 65 wt % and about 75 wt % of at least one ceramic material in particulate form;

between about 3 wt % and about 8 wt % of at least one phosphate-based binder;

between about 4 wt % and about 14 wt % of ceramic microspheres;

between about 0.05 wt % and about 3 wt % of an energy absorbing and conducting additive selected from carbon black, carbon powder, silicon carbide, aluminum nitride, boron nitride and silicon nitride, and mixtures thereof; and between about 10 wt % and about 20 wt % of at least one carrier liquid;

the paste composition having a mass loss of at least about 10 wt % out of the total mass of the paste composition when heated to about 220° C. for a period of time of no more than about 30 minutes.

According to another aspect of this disclosure, there is provided a method of preparing a paste composition as disclosed herein, the method comprising mixing said at least one refractory ceramic material with a mixture that comprises said carrier liquid, said at least one inorganic binder, said at least one porosity controlling additive, and said at least one of an energy absorbing/energy conductive additive to obtain said paste composition.

According to another aspect of this disclosure, there is provided a method of preparing a paste composition as disclosed herein, the method comprising providing a first mixture that comprises said carrier liquid and said at least one inorganic binder;

preparing a second mixture of said at least one refractory ceramic material, said at least one porosity controlling additive, and said at least one of an energy absorbing/energy conductive additive; and mixing said first and second mixtures to obtain said paste composition.

According to yet another aspect of this disclosure, there is provided a method of preparing a paste composition as disclosed herein, the method comprising providing a first mixture that comprises said carrier liquid, said at least one of an energy absorbing/energy conductive additive, and said at least one inorganic binder; preparing a second mixture of said at least one refractory ceramic material and said at least one porosity controlling additive; and mixing said first and second mixtures to obtain said paste composition.

According to some embodiments, mixing is carried out at a temperature of no more than about 30° C., e.g. the temperature is maintained during mixing at a range of between about 10° C. and about 25° C.

According to some embodiments, one or more pre-treatments can be applied to the refractory ceramic material. Thus, any one of the following pre-treatments can be applied to the refractory ceramic material prior to mixing with the components of the paste composition: modifying the moisture content of the ceramic particles (e.g. drying or hydrating the ceramic particles), modifying the particles' morphology (e.g. rounding, forming jagged shape, etc.), modifying the size of the particles (e.g. milling, sieving, crushing, agglomerating, fracturing, etc.), modifying the surface texture of the particles (e.g. smoothing or roughening), modifying the surface properties or composition of the particles (e.g. coating, absorbing binding moieties, activating), or any other suitable pre-treatment.

By another aspect, this disclosure provides a cartridge for holding and dispensing the paste composition as disclosed herein, the cartridge comprises a container for holding the paste composition, one or more dispensing nozzles configured to permit dispensing of the paste composition from the container, and one or more mixing means disposed within the container for mixing the paste composition.

The cartridge is typically designed for interfacing with a suitable deposition system, such as that described in PCT patent applications publication numbers WO2019053712, WO2023002468 and WO2022243921, and/or in PCT patent applications serial numbers, PCT/IL2022/051188, PCT/IL2022/051190, and PCT/IL2022/051191, all of which assigned to the assignee of the present application, and incorporated herein by reference.

The cartridge can be designed to be detachably attached to said deposition system. Alternatively, the cartridge can be designed to be an integral part of the deposition system, and configured for filling with said paste composition upon demand.

As the paste composition is a viscous slurry, the cartridge comprises one or more mixing means to maintain homogeneity of the paste composition before and during deposition. The term mixing means is meant to denote any suitable mixing or agitation means that can keep the paste composition under flow to minimize or avoid sedimentation of the solid components out of the slurry. Exemplary mixing means are mechanical stirrers, magnetic stirrers, ultrasonic transducers, circulation loops, etc. The container can also include one or more baffling arrangements or flow diverters to obtain a pre-defined flow profile within the container.

According to some embodiments, the mixing means are configured for continuous or intermittent mixing of the paste in the container.

It is at time desired to introduce one or more gasses, e.g. inert or reactive gases, into the container. For example, depending on the stability or volatility of additives in the paste composition, it is desired to maintain the paste under inert conditions or under slightly pressurized conditions. Thus, according to some embodiments, the cartridge can comprise one or more gas inlets, configured for introducing gas into the container. According to some embodiments, the container is configured to maintain the paste composition under pressure.

The cartridge can also include one or more vents to permit gas discharge from the container, for example of gaseous reaction products or liquid carrier products.

By another aspect, the disclosure provides a process for additive printing of a mold-metal composite object, the process comprising:
 (a) depositing a paste composition as disclosed onto a receiving surface to form at least one mold region;
 (b) heating the at least one mold region to at least 220° C. for no more than 30 minutes to at least partially polymerize said inorganic binder and reduce the overall mass of the paste composition by at least 10 wt %;
 (c) depositing molten metal into a cavity defined by the at least one mold region, to obtain at least one metal object region;
 (d) allowing the molten metal to at least partially solidify, thereby obtaining a production layer of said mold-metal composite object; and
 (e) depositing paste composition as disclosed herein to form at least one subsequent mold region over the production layer; and
 (f) heating the at least one subsequent mold region to at least 220° C. for no more than 30 minutes to at least partially polymerize said inorganic binder and reduce the overall mass of the paste composition by at least 10 wt %;
 (g) depositing molten metal into a cavity defined by the at least one subsequent mold region, to obtain at least subsequent metal object region;
 (h) allowing the molten metal to at least partially solidify, thereby obtaining a subsequent production layer of said mold-metal composite object; and
 (i) repeating steps (e)-(h) to form a stack of production layers, constituting together said mold-metal composite object.

By another aspect of this disclosure, there is provided a process for additive printing of a metal object, the process comprising:
 (a) depositing a paste composition as disclosed herein onto a receiving surface to form at least one mold region;
 (b) heating the at least one mold region to at least 220° C. for no more than 30 minutes to at least partially polymerize said inorganic binder and reduce the overall mass of the paste composition by at least 10 wt %;
 (c) depositing molten metal into a cavity defined by the at least one mold region, to obtain at least one metal object region;
 (d) allowing the molten metal to at least partially solidify, thereby obtaining a production layer of said mold-metal composite object; and
 (e) depositing paste composition as disclosed herein to form at least one subsequent mold region over the production layer; and
 (f) heating the at least one subsequent mold region to at least 220° C. for no more than 30 minutes to at least partially polymerize said inorganic binder and reduce the overall mass of the paste composition by at least 10 wt %;
 (g) depositing molten metal into a cavity defined by the at least one subsequent mold region, to obtain at least subsequent metal object region;
 (h) allowing the molten metal to at least partially solidify, thereby obtaining a subsequent production layer of said mold-metal composite object;
 (i) repeating steps (e)-(h) to form a stack of production layers, constituting together a mold-metal composite object; and
 (j) removing the mold regions from the mold-metal composite object to obtain said metal object.

In some configurations, it is desired to have a complex mold region, typically comprising two adjacent sections, laterally arranged within the production layer. Such configurations can provide a mold region having zones of different functionalities, e.g. having different mechanical properties, different drying rates, different polymerization rates, etc. The complex mold region is typically constructed out of a first mold section made of a first paste composition of this disclosure, which laterally surrounds a second mold section of a second composition (which may or may not be a paste composition of this disclosure), in which the metal casting cavity is defined. Together, the first and second mold sections constitute a mold region in production layer.

In some configurations, the two adjacent regions are formed out of two different paste compositions of this disclosure. Thus, by another aspect, there is provided a process for additive printing of a mold-metal composite object, the process comprising:
 (A) depositing onto a receiving surface
  a first mold composition as disclosed herein onto a receiving surface to form at least one first mold section, and
  a second mold composition as disclosed herein to form at least one second mold section, laterally surrounded by said first mold section and in contact therewith, said second mold composition being different from said first mold composition, the first and second mold sections defining together at least one mold region;
 (B) heating the at least one mold region to at least 220° C. for no more than 30 minutes to at least partially polymerize said inorganic binder and reduce the overall mass of the first and second mold compositions by at least 10 wt %;

(C) depositing molten metal into a cavity defined by the at least one mold region, to obtain at least one metal object region;
(D) allowing the molten metal to at least partially solidify, thereby obtaining a production layer of said mold-metal composite object; and
(E) depositing said first mold composition to form a subsequent first mold section, and said second mold composition to form a subsequent second mold section laterally surrounded by said subsequent first mold section and in contact therewith, the first and second subsequent mold sections defining together at least one subsequent mold region;
(F) heating the at least one subsequent mold region to at least 220° C. for no more than 30 minutes to at least partially polymerize said inorganic binder and reduce the overall mass of the first and second mold compositions by at least 10 wt %;
(G) depositing molten metal into a cavity defined by the at least one subsequent mold region, to obtain at least subsequent metal object region;
(H) allowing the molten metal to at least partially solidify, thereby obtaining a subsequent production layer of said mold-metal composite object; and
(I) repeating steps (E)-(H) to form a stack of production layers, constituting together said mold-metal composite object.

By yet another aspect, there is provided a process for additive printing of a metal object, the process comprising:
(A) depositing onto a receiving surface
a first mold composition as disclosed herein onto a receiving surface to form at least one first mold section, and
a second mold composition as disclosed herein to form at least one second mold section, laterally surrounded by said first mold section and in contact therewith, said second mold composition being different from said first mold composition, the first and second mold sections defining together at least one mold region;
(B) heating the at least one mold region to at least 220° C. for no more than 30 minutes to at least partially polymerize said inorganic binder and reduce the overall mass of the first and second mold compositions by at least 10 wt %;
(C) depositing molten metal into a cavity defined by the at least one mold region, to obtain at least one metal object region;
(D) allowing the molten metal to at least partially solidify, thereby obtaining a production layer of said mold-metal composite object; and
(E) depositing said first mold composition to form a subsequent first mold section, and said second mold composition to form a subsequent second mold section laterally surrounded by said subsequent first mold section and in contact therewith, the first and second subsequent mold sections defining together at least one subsequent mold region;
(F) heating the at least one subsequent mold region to at least 220° C. for no more than 30 minutes to at least partially polymerize said inorganic binder and reduce the overall mass of the first and second mold compositions by at least 10 wt %;
(G) depositing molten metal into a cavity defined by the at least one subsequent mold region, to obtain at least subsequent metal object region;
(H) allowing the molten metal to at least partially solidify, thereby obtaining a subsequent production layer of said mold-metal composite object;
(I) repeating steps (E)-(H) to form a stack of production layers, constituting together a mold-metal composite object; and
(J) removing the mold regions from the mold-metal composite object to obtain said metal object.

The first and second paste compositions can differ in any one of the ceramic material type, the ceramic material concentration, the inorganic binder type, the inorganic binder concentration, the porosity controlling additive type, the porosity controlling additive concentration, the energy absorbing and/or conductive additive type, the energy absorbing and/or conductive additive concentration, the carrier liquid type, or the carrier liquid concentration.

For example, the inorganic binder of the first paste composition can be selected to have a polymerization rate that is faster than the polymerization rate of the inorganic binder of the second paste composition at a given temperature. In another example, the inorganic binder of the first paste composition can be selected to have a polymerization temperature that is lower than the polymerization temperature of the inorganic binder in the second paste composition. In such examples, the inorganic binder of the first paste composition reaches a desired degree of polymerization faster at a given temperature, and/or at a lower temperature, than the inorganic binder of the second mold composition. This permits the first mold section to reach mechanical stability faster than the second mold section, thereby enable the first mold section to provide mechanical support to the second mold section during the various heating processes to which the mold region is exposed during molten metal casting steps.

In other configurations, the first mold section comprises a paste composition of this disclosure, while the second mold section comprises a ceramic composition that is devoid one or more of the porosity controlling additive, the energy absorbing additive and/or the energy conductive additive.

Thus, by another aspect, there is provided a process for additive printing of a mold-metal composite object, the process comprising:
(A) depositing onto a receiving surface
a first mold composition as disclosed herein onto a receiving surface to form at least one first mold section, and
a ceramic composition to form at least one second mold section, laterally surrounded by said first mold section and in contact therewith, said ceramic composition being different from said first mold composition, the first and second mold sections defining together at least one mold region;
(B) heating the at least one mold region to at least 220° C. for no more than 30 minutes to at least partially polymerize said inorganic binder and reduce the overall mass of the first and second mold compositions by at least 10 wt %;
(C) depositing molten metal into a cavity defined by the at least one mold region, to obtain at least one metal object region;
(D) allowing the molten metal to at least partially solidify, thereby obtaining a production layer of said mold-metal composite object; and
(E) depositing said first mold composition to form a subsequent first mold section, and said ceramic composition to form a subsequent second mold section laterally surrounded by said subsequent first mold section and in contact therewith, the first and second subsequent mold sections defining together at least one subsequent mold region;

(F) heating the at least one subsequent mold region to at least 220° C. for no more than 30 minutes to at least partially polymerize said inorganic binder and reduce the overall mass of the first and second mold compositions by at least 10 wt %;

(G) depositing molten metal into a cavity defined by the at least one subsequent mold region, to obtain at least subsequent metal object region;

(H) allowing the molten metal to at least partially solidify, thereby obtaining a subsequent production layer of said mold-metal composite object; and (I) repeating steps (E)-(H) to form a stack of production layers, constituting together said mold-metal composite object.

By yet another aspect, there is provided a process for additive printing of a metal object, the process comprising:

(A) depositing onto a receiving surface
a first mold composition as disclosed herein onto a receiving surface to form at least one first mold section, and
a ceramic composition to form at least one second mold section, laterally surrounded by said first mold section and in contact therewith, said ceramic composition being different from said first mold composition, the first and second mold sections defining together at least one mold region;

(B) heating the at least one mold region to at least 220° C. for no more than 30 minutes to at least partially polymerize said inorganic binder and reduce the overall mass of the first and second mold compositions by at least 10 wt %;

(C) depositing molten metal into a cavity defined by the at least one mold region, to obtain at least one metal object region;

(D) allowing the molten metal to at least partially solidify, thereby obtaining a production layer of said mold-metal composite object; and (E) depositing said first mold composition to form a subsequent first mold section, and said ceramic composition to form a subsequent second mold section laterally surrounded by said subsequent first mold section and in contact therewith, the first and second subsequent mold sections defining together at least one subsequent mold region;

(F) heating the at least one subsequent mold region to at least 220° C. for no more than 30 minutes to at least partially polymerize said inorganic binder and reduce the overall mass of the first and second mold compositions by at least 10 wt %;

(G) depositing molten metal into a cavity defined by the at least one subsequent mold region, to obtain at least subsequent metal object region;

(H) allowing the molten metal to at least partially solidify, thereby obtaining a subsequent production layer of said mold-metal composite object;

(I) repeating steps (E)-(H) to form a stack of production layers, constituting together a mold-metal composite object; and (J) removing the mold regions from the mold-metal composite object to obtain said metal object.

In some embodiments, the first and second paste compositions are deposited simultaneously in steps (A) and (E).

In other embodiments, the first paste composition is deposited before the second paste composition in steps (A) and (E).

In yet other embodiments, the second paste composition is deposited before the first paste composition in steps (A) and (E).

According to some embodiments, the mass ratio between said first mold section and said second mold section in a production layer ranges between about 1.5:1 and about 15:1, e.g. between about 3:1 and about 15:1.

According to some embodiments, said first mold section has a first width and the second mold section has a second width, the ratio between said first width and second width ranges between about 1.5:1 and about 15:1, e.g. between about 3:1 and about 15:1.

In some embodiments, at least a portion of the surface of the cavity (i.e. a metal-facing surface of the cavity defined by the mold region) is coated by a coating formulation, for example a smoothing coating or a refractory coating.

In some processes, the paste composition forms a self-standing mold region after deposition of the paste. In other words, the paste composition(s) is (are) viscous enough or sufficiently mechanically stable to substantially maintain the deposited shape without further mechanical support.

In other processes, the paste composition requires mechanical support while the paste undergoes polymerization and drying. Thus, according to some embodiments, the processes comprises a step (A0), prior to step (A), step (A0) comprises depositing a barrier wall composition, to form a closed-loop barrier wall having at least the height of the mold-metal composite object, such that the first and second paste compositions (or the first composition and the ceramic composition) are deposited within boundaries defined by the closed-loop barrier wall.

In other words, in such embodiments, prior to deposition of the paste compositions (namely the first and second paste compositions, or the first composition and the ceramic composition), a surrounding barrier wall is deposited, with a height that is at least the height of the finished mold-metal composite object, and the fabrication and stacking of production layers is carried out within boundaries defined by the barrier wall. in such configurations, the barrier wall is manufactured in a single preliminary step of production to have the vertical dimension of the final mold-metal object.

Alternatively, the barrier wall can be manufactured in an additive process, namely, in each production layer another vertical section of the barrier wall is deposited. In such embodiments, the processes comprise: a step (A0) prior to step (A), step (A0) comprises depositing a barrier wall composition, to form a closed-loop barrier wall region, such that the first and second paste compositions in step (A) are deposited within boundaries defined by the closed-loop barrier wall region; and a step (E0) between steps (D) and (E), step (E0) comprises depositing said barrier wall composition, to form a subsequent closed-loop barrier wall region, such that the first and second paste compositions in step (E) are deposited within boundaries defined by the subsequent closed-loop barrier wall region. In other words, in such processes, a barrier wall region is formed in each production layer.

In some such embodiments, in steps (A) and (E), the second paste composition (or the ceramic composition) is deposited before the first paste composition-namely the second paste composition (or the ceramic composition) is deposited laterally spaced-apart from the barrier wall region, and the first paste composition is deposited into a space defined between the second mold section and the barrier wall region.

As used herein, the singular form "a", "an" and "the" include plural references unless the context clearly dictates otherwise.

As used herein, the term about is meant to encompass deviation of ±10% from the specifically mentioned value of a parameter, such as temperature, pressure, concentration, etc.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Unless the context requires otherwise, the word comprise, and variations such as comprises and comprising, will be understood to imply the inclusion of a stated integer or step or group of integers or steps but not the exclusion of any integer or step or group of integers and steps.

Generally, it is noted that the term . . . at least one . . . as applied to any component of a composition of this disclosure should be read to encompass one, two, three, four, five, or even more different occurrences of said component in the composition.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
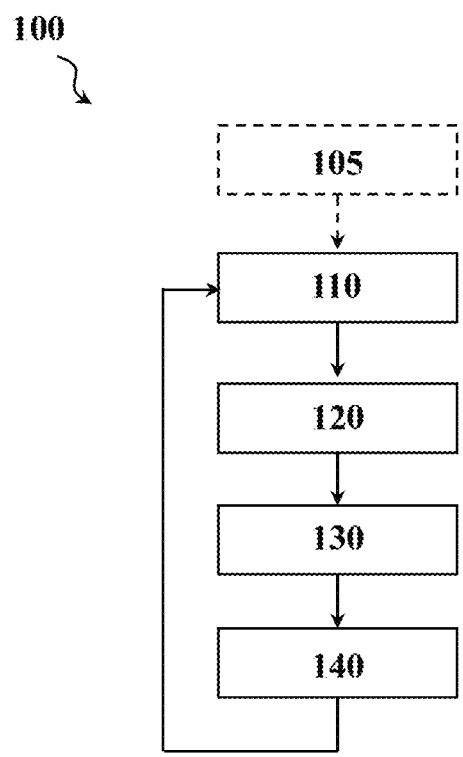
FIGS. 1A-1B are schematic representation of an additive casting process of a metal object according to an embodiment of this disclosure, in which paste compositions of this disclosure are used for construction of the mold regions in the production layers of the mold-metal fabricated structure.
Figure 1B:
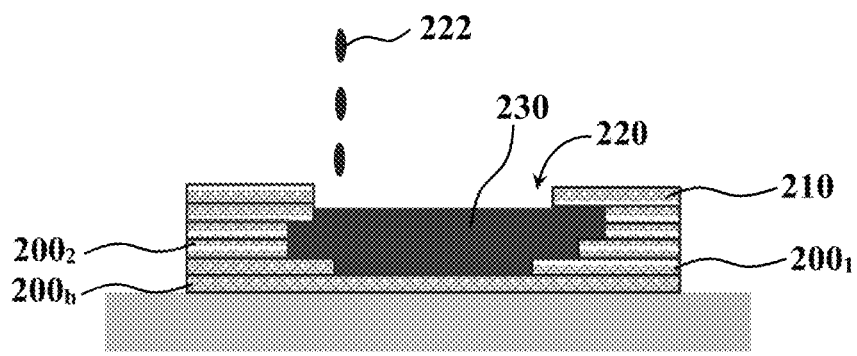
Figure 1C:
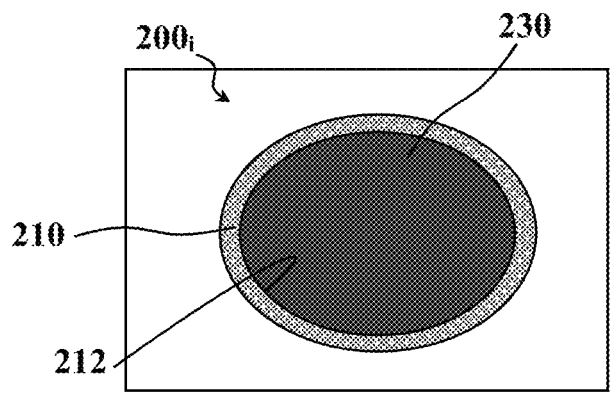
FIGS. 1C-1D are schematic top view of production layers: comprising a mold region and a metal object region (FIG. 1C), and a mold region and multiple metal object regions (FIG. 1D).

Reference is first being made to FIGS. 1A-1C, showing steps of an exemplary additive casting process of a metal object, in which paste compositions of this disclosure are used for the construction of mold-metal structures fabricated from a stack of production layers.

Process 100 comprises deposition 110 of a paste composition according to a desired mold contour in a production layer 200$i$ (i being an integer (i>0) defining the number of the production layer). The deposited paste composition is then heated at step 120, continuously or in several heating intervals, to obtain at least partial polymerization of the inorganic binder and a reduction of at least 10 wt % of its total mass of its total mass within no more than 30 minutes, to form the mold region 210 of the production layer 200$_1$.

At this stage, the mold region 210 is stable enough to carry out one or more post-deposition surface treatments (not shown), if desired, in order to smoothen the surface texture (e.g. the inner walls 212 of mold region 210) or define surface features of the mold region.

At step 130, molten metal is being cast into the cavity 220 defined by the mold region. The metal 225 then cools at step 140 to at least partially solidify, thereby forming the metal object region 230 and completing the manufacture of the first production layer, before deposition of fresh paste to form the mold region of the ensuing production layer 200$_2$. The cycle of steps 110-140 is repeated, such that a stack of production layers is obtained, by consecutive cycles of production layers fabrication, until the end of the casting of the entire metal object.

Step 130 comprises the deposition of molten metal (represented in FIG. 1B by molten metal drops 222) into cavity 220. For example, molten metal 222 is deposited while a metal depositor (not shown) is positioned above cavity 220. Step 130 may comprise pre-deposition heating of the previously-cast metal region(s) 225 such that the top surface of metal region 225—the previously deposited metal—may be in at least partially molten state during molten metal deposition of the subsequent quanta of molten metal. Step 130 may further comprise post-deposition heating of the deposited object region to modify its cooling profile. In some embodiments, step 130 is implemented in a sequential manner on a plurality of working areas (not shown) that constitutes object region 220. For example, a metal head (not shown) composed of molten metal depositor and working area heater, travels over object region 220 during step 130.

As seen in FIGS. 1A-1B, prior to deposition of the first mold region, a base paste layer 200b can be deposited (at optional step 105), as a substantially continuous base layer (i.e. without object regions), thereby functioning as a solid mold base layer.

Figure 1D:
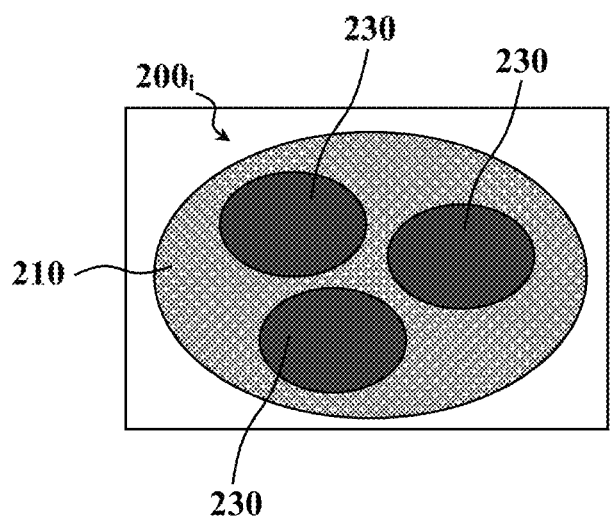

As can be seen in FIG. 1D, several metal object regions 230 can be formed in a single mold region 210, thereby forming a nested configuration of several, separate metal objects to be produced.

Figure 2A:
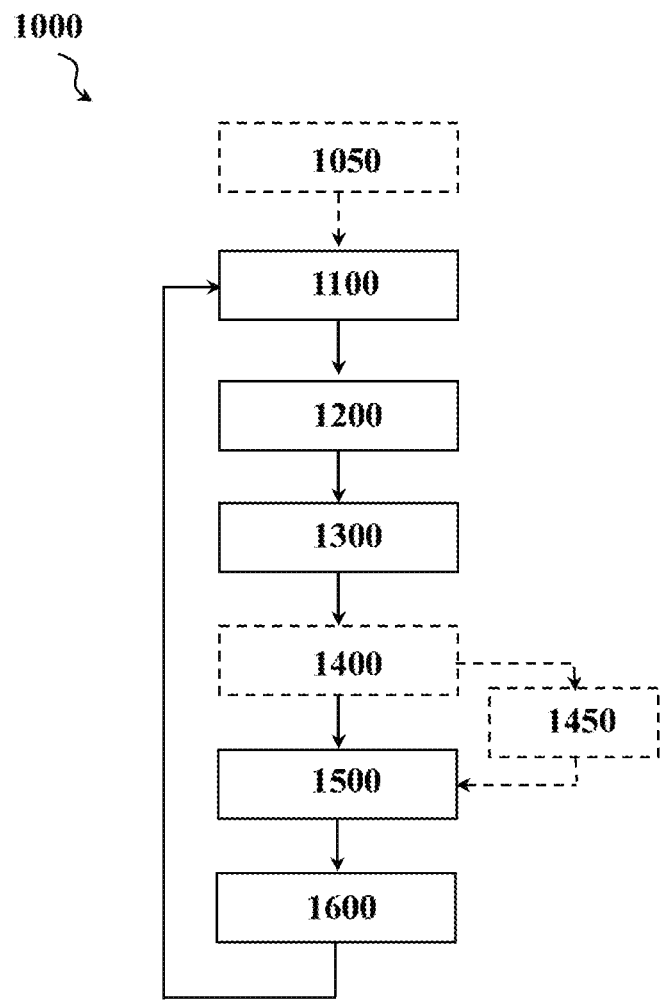
FIGS. 2A-2B are schematic representation of an additive casting process of a metal object, in which a complex mold region is applied in the production layers of the mold-metal fabricated structure, according to another embodiment of this disclosure.
Figure 2B:
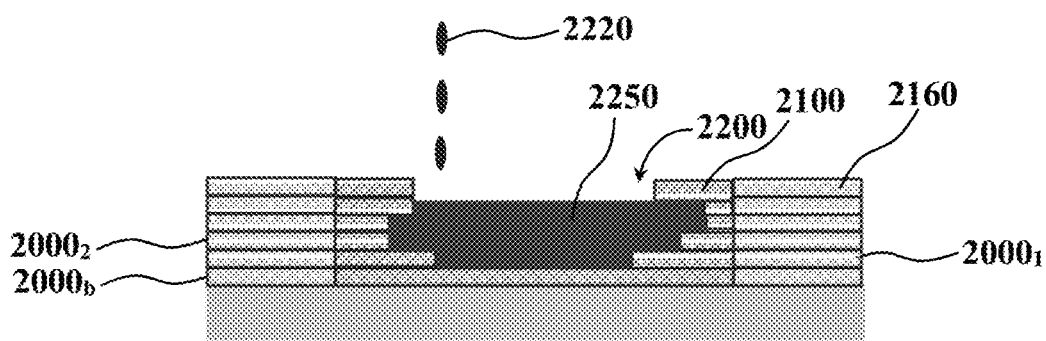
Figure 2C:
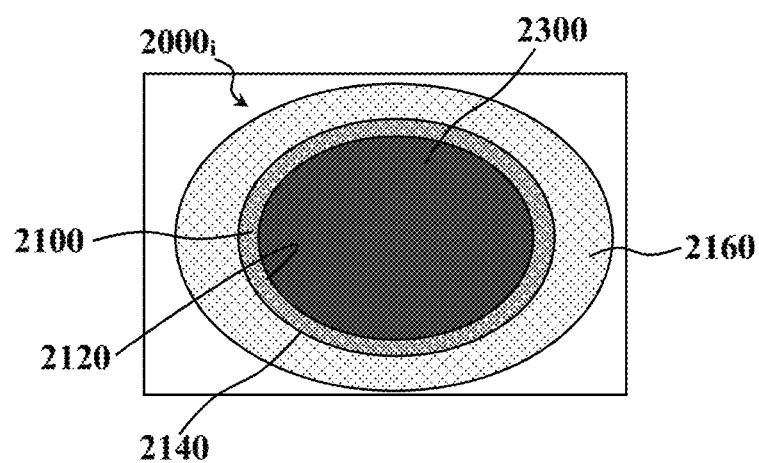
FIG. 2C is a schematic top view of a production layer of the embodiment of FIGS. 1A-1B, comprising a first mold section, a second mold section and a metal object region.

FIGS. 2A-2C show the steps of another exemplary additive casting process of a metal object, in which two paste compositions of this disclosure are used for manufacturing the mold region in a production layer.

In process 1000 comprises deposition 1100 of a paste composition according to a desired mold contour in a production layer 2000i (i being an integer (i>0) defining the number of the production layer), to form a second mold section 2100.

Another paste composition of this disclosure is then deposited, at step 1200, adjacent the second mold section 2100, to form a first mold section 2160 that laterally encloses the second mold section 2100. The first mold section 2160 is deposited such as to form a substantially continuous inter-mold interface 2140 (to ensure physical contact between the first and second mold sections along this interface). The mold region is then heated at step 1300, to permit at least partial polymerization of the inorganic binder, as well as mass loss of at least 10 wt %, to thereby mechanically stabilize of the mold region. As noted above, in such configurations, the first and second mold sections differ in at least one property (e.g. in their drying rate, polymerization temperature, polymerization rate, etc.), or differ in composition. Due to this difference, one of the mold sections mechanically stabilizes before the other, hence providing mechanical support to said other mold section until said other mold section is sufficiently stable for the next manufacturing step of the production layer.

The mold region is then optionally further heated, at step 1400, for further mechanical stabilization, followed by deposition of molten metal 2220 into cavity 2200 formed by the mold region 2100, at step 1500. The molten metal is then permitted to cool and at least partially solidify, at step 1600, thereby forming the metal object region 2300. In this manner, a production layer, e.g. layer 20001, that includes the first mold section 2160, the second mold section 2100 and the metal region 2300 is formed. Deposition of the next production layer, e.g. layer 20002, can then commence by repeating the steps 1100-1500 to form a stack of production layers, until the entire object is manufactured in an additive process.

An optional step 1450 can be carried out between steps 1400 and 1500. After step 1300 (or 1400, if applied), the mold region 2100 is stable enough to carry out one or more post-deposition surface treatments (step 1450), if desired, in order to smoothen the surface texture of metal-facing surface 2120 or define desired surface features of the mold-facing surface.

Further, step 1500 can comprise pre-deposition heating of the previously-cast metal object region(s) 2250 such that the top surface of metal object region 2250—the previously deposited metal—may be in at least partially molten state during molten metal deposition of the subsequent quanta of molten metal. Step 1500 may further comprise post-deposition heating of the deposited metal object region to modify its cooling profile. In some embodiments, step 1500 is implemented in a sequential manner on a plurality of working areas (not shown) that constitutes metal object region 2200. For example, a metal head (not shown) composed of molten metal depositor and working area heater, travels over metal object region 2200 during step 1500.

As seen in FIG. 2A, prior to deposition of the first mold region, a base mold layer 2000b can be deposited (at step 1050), as a substantially continuous base layer (i.e. without object regions), thereby functioning as a solid mold base layer.

It is of note that while in this example the second mold section is formed before the first mold section, it will become apparent to any person of skill that the first mold section can also be formed before the second mold section. Further, it will become apparent that in some production layers the first mold section is formed before the second section, and in other production layers of the same mold-metal object the order of deposition can be reversed.

Alternatively, the first and second paste compositions can be deposited simultaneously, e.g. from adjacent deposition nozzles.

The embodiment shown in FIGS. 1A-2C is exemplary for application of a paste composition according to this disclosure that is self-standing, namely, sufficiently viscous to maintain its deposited shape without further support. Examples of applications in which the paste composition requires initial mechanical support prior to polymerization are provided in FIGS. 3A-3B and 4A-4C.

Figure 3A:
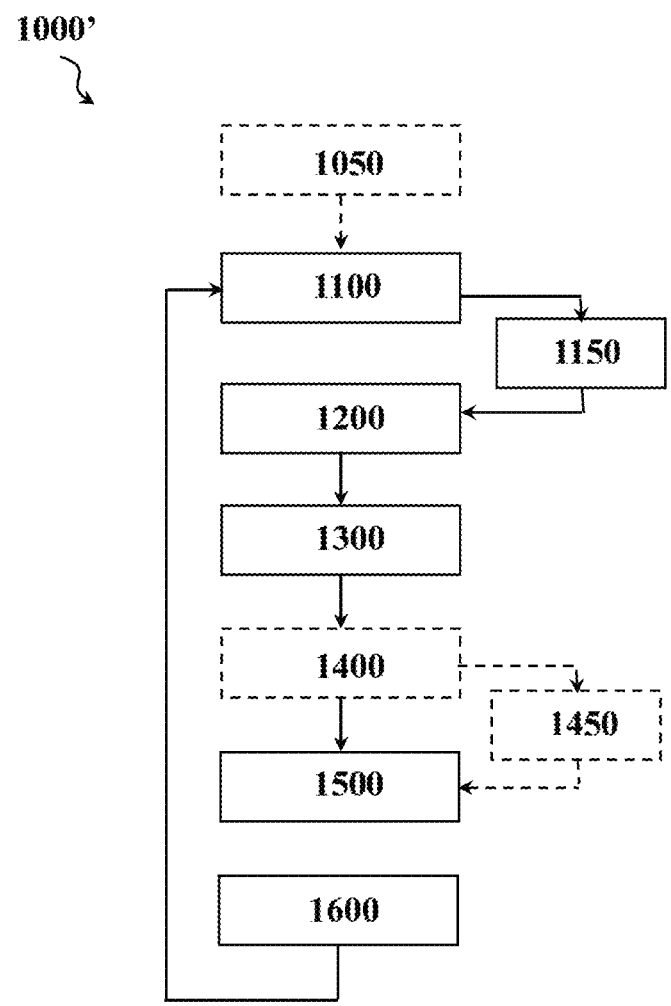
FIGS. 3A-3B are schematic representation of an additive casting process of a metal object, in which a complex mold region is applied in the production layers of the mold-metal fabricated structure, according to another embodiment of this disclosure.
Figure 3B:
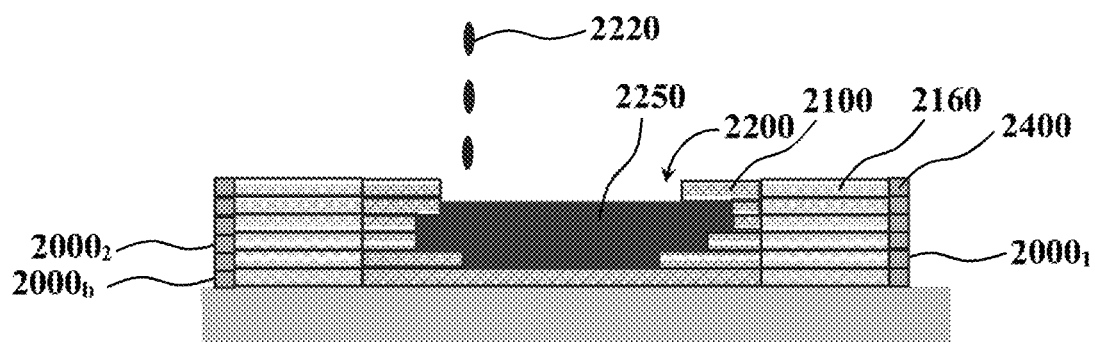

In the embodiment of FIGS. 3A-3B, a process 1000' similar to process 1000 of FIGS. 2A-2B is demonstrated, however including a step 1150 of forming a barrier wall 2400 prior to deposition of the first paste composition in step 1200. Thus, the first paste composition is deposited to the space formed between barrier wall 2400 and surface 2140 of the second mold section 2100. In process shown in FIGS. 3A-3B, the barrier wall is constructed in an additive manner—namely, for each production layer 2000i, another vertical section of barrier wall 2400 is deposited.

Figure 4A:
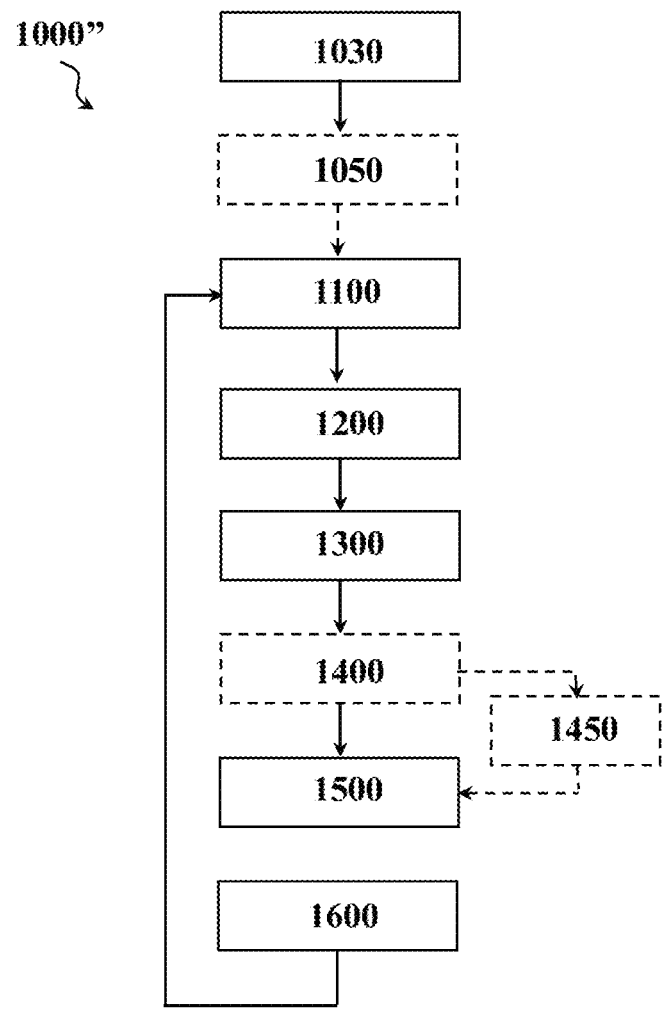
FIGS. 4A-4B are schematic representation of an additive casting process of a metal object, in which a complex mold region is applied in the production layers of the mold-metal fabricated structure, according to another embodiment of this disclosure.
Figure 4B:
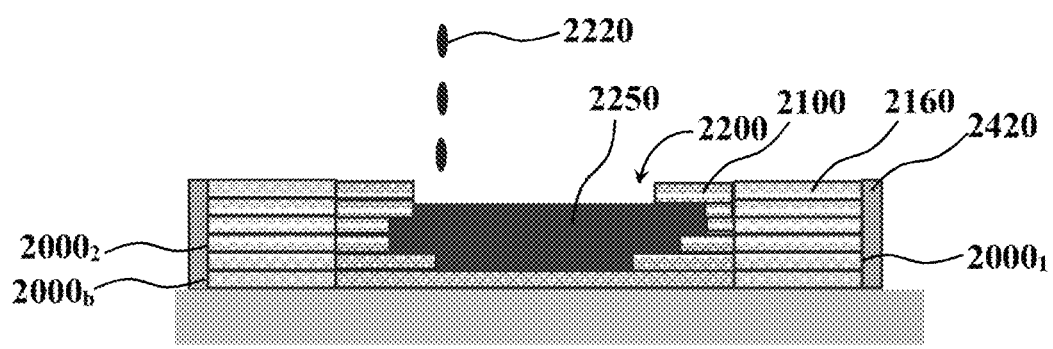

In the embodiment of FIGS. 4A-4B, process 1000" is similar to process 1000', however in this process a vertically continuous barrier wall 2420 is deposited at step 1030, such that the barrier wall 2420 has a height that is at least the same as the height of the final mold-metal object to be produced.

Figure 4C:
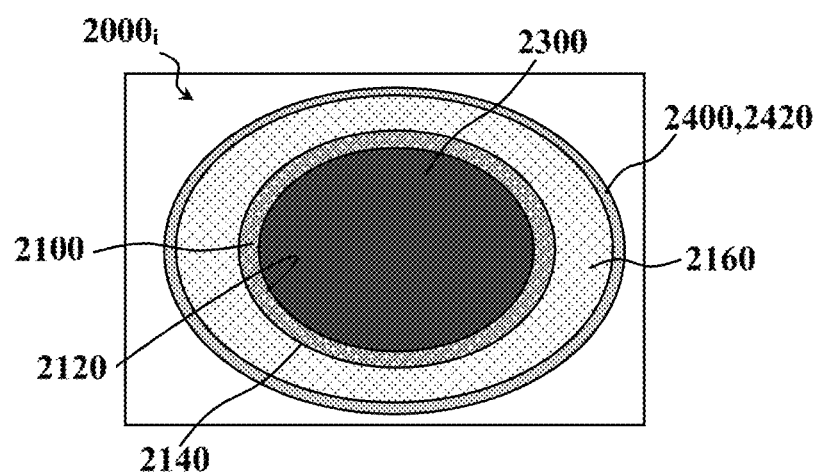
FIG. 4C is a schematic top view of a production layer of the embodiment of FIGS. 2A-2B or FIGS. 3A-3B, comprising a barrier wall, a complex mold region (constructed out of first and second sections) and a metal object region.

As can be seen in FIG. 4C, the processes of FIGS. 3A-3B and 4A-4B result in a construction of production layers that are constituted by a barrier wall, a mold region constituted by first and second mold sections, and a metal object region.

In the embodiments of FIGS. 3A-4C, it is sometimes desirable to utilize a paste composition that is self-leveling for forming the first mold section, such that the top surface of the mold region in a given production layer is substantially flat (i.e. substantially parallel to the receiving surface), such that a metal-over-mold construction can be obtained.

As noted, the paste compositions of this disclosure are designed to be suitable for such mold-metal additive casting processes, particularly tailored to maintain their mechanical stability and mold integrity during the cycles of extensive heat shocks and applied stresses (e.g. due to volume changes of the melting and solidifying metal in the object region).

The paste composition of the present disclosure is deposited to form mold regions having controlled gaseous products release rate and improved heat absorbance/conductance, such that once exposed to heat (e.g. resulting from contact with the molten metal or from external heating), the paste composition functions to provide mechanically stabilized mold regions, improved heat dissipation through the mold region bulk and reduced risk of mechanical failure. In other words, the paste compositions of this disclosure are characterized by controlled energy absorbance and conduction, as well as controlled gas release during their polymerization and drying, thereby enabling obtaining mold regions that reach thermal and mechanical stability relatively fast with reduced risk of mechanical failure.

The paste compositions of this disclosure are designed to have efficient energy absorption and dissipation. This permits for effective energy uptake and transfer through the voluminous mold region during casting, to minimize the thermal shock experienced by the mold region during casting and thermal cycling. In addition, efficient and controllable gas release from the paste composition during absorption of such heat enables minimizing the mechanical damage that can be formed due to uncontrolled and abrupt gas release from the mold region (e.g. due to boiling liquid or gaseous chemical reaction products), hence, maintaining the mechanical integrity of the mold (and particularly the metal-mold interface) throughout the casting process.

The inventors have surprisingly found that in paste compositions of this disclosure, effective energy (e.g. heat) uptake and effective heat dissipation through the mold region, together with controlled evacuation of gaseous products, can be obtained to permit a relatively quick cycle time in the additive manufacturing process. By controlling overall porosity formed during heating and drying of the paste composition, it was found that a balance between energy uptake and dissipation with control over the gaseous products evacuation can be obtained. Without wishing to be bound by theory, by forming paths for gaseous products release, porosity prevents internal pressure buildup during drying of the paste (which is carried out by applying heating conditions). Further, by temporarily physi-sorb molecules of the carrier liquid, e.g. water, a delay in moisture and/or the rate of vaporization of the carrier liquid from the paste composition can be obtained, thereby assisting in preventing rapid shrinkage and/or capillary collapse. Addition of an energy absorption and/or conductance additive improves heat uptake and dissipation through the bulk of the mold region. The balance between the fast energy absorption and dissipation, that cause quick increase in temperature within the bulk of the mold region, together with the careful control over the porosity formed during the drying process, results in optimal rate of drying and/or gaseous products evacuation from the mold region. Such balance permits a significant reduction in the risk of cracking or popping effects at the bulk of the mold region as well as at its surface, while also permitting high resistance of the mold region to thermal shock, thereby permitting relatively short fabrication cycles at elevated temperatures and cost-effective process.

Example 1

In order to demonstrate the combined effect of the porosity controlling additive and the energy absorption/conductivity additive, paste compositions were prepared according to Table 1 and 1-2:

TABLE 1-1

Tested paste compositions (wt %)

| Component | Function | Comp. 1 | Comp. 2 | Comp. 3 | Comp. 4 |
| --- | --- | --- | --- | --- | --- |
| Zirconia powder | Ceramic | 72-80 | 65-75 | 70-80 | 65-75 |
| Sodium silicate | Inorganic binder | 3-6 | 3-6 | 3-6 | 3-6 |
| Alumina microspheres | Porosity-controlling additive | — | 5-10 | — | 5-10 |
| Carbon-based additive | Energy absorbance & conductance additive | — | — | 0.5-3 | 0.5-3 |
| Additives | Surfactants, solvents, etc. | 1-5 | 1-5 | 0.5-5 | 0.5-5 |
| Water | Carrier liquid | 11-17 | 11-17 | 11-17 | 11-17 |

TABLE 1-2

Tested paste compositions (wt %)

| Component | Function | Comp. 5 | Comp. 6 |
| --- | --- | --- | --- |
| Zirconia powder | Ceramic | 65-75 | 65-75 |
| Aluminum phosphate | Inorganic binder | 3-6 | 3-6 |
| Alumina microspheres | Porosity-controlling additive | — | 5-10 |
| Energy absorbance & conductance additive | Energy absorbance & conductance additive | 0.5-5 | 0.5-5 |
| Additives | Surfactants, solvents, etc. | 1-5 | 1-5 |
| Water | Carrier liquid | 11-17 | 11-17 |

Small scale samples were prepared to assess the effect on the mass loss, drying profile and the mechanical stability of the compositions.

Small scale mass loss and drying profile was assessed using Radwag MA50R halogen lamp moisture scale, using 3-7 g samples, at heating to 220-230° C., at ambient atmosphere.

Figure 5:
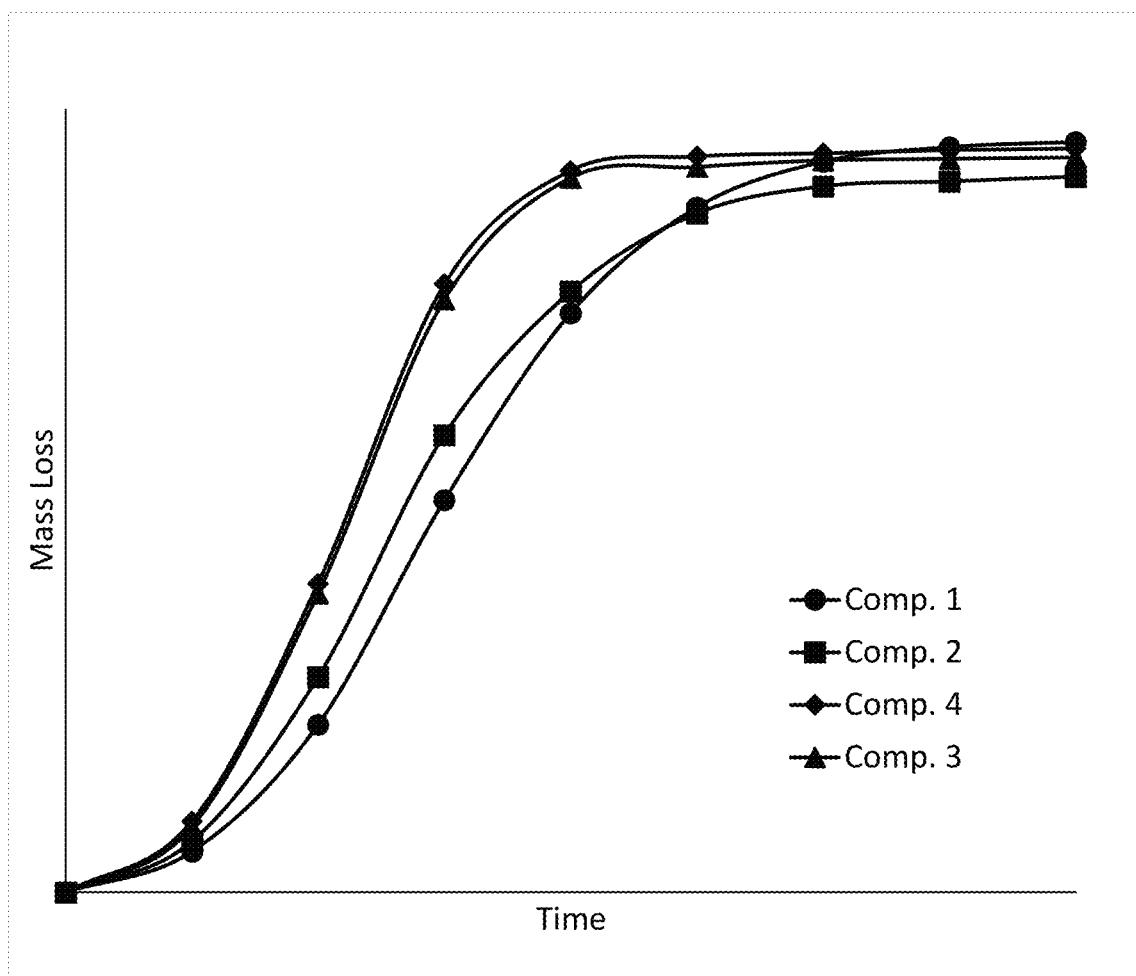
FIG. 5 shows small-scale mass loss tests for various paste compositions.
Figure 6A:
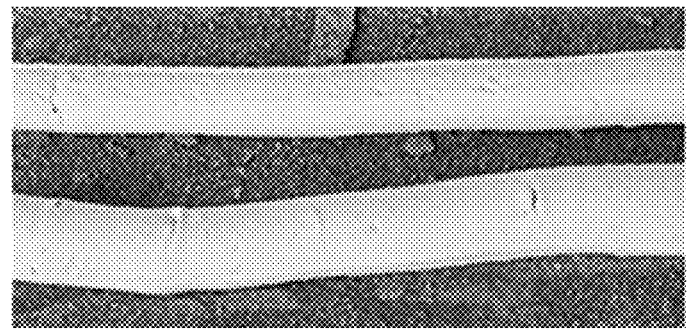
FIGS. 6A-6D are images of dried samples of paste compositions Form. 1-Form 4, respectively, as detailed in Table 1.
Figure 6B:
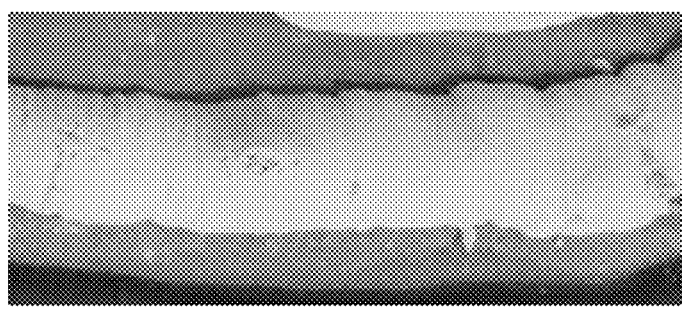
Figure 6C:
Figure 6D:
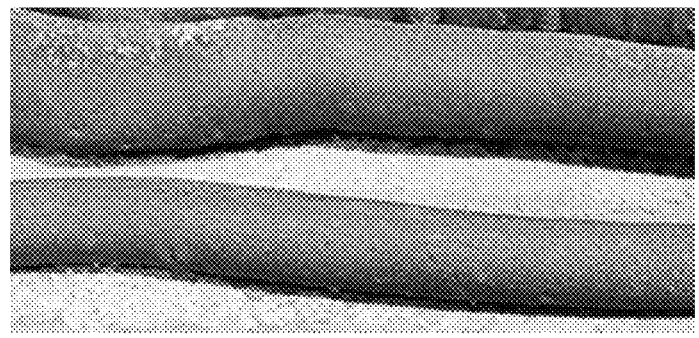

The results for the small scale mass loss tests are shown in FIG. 5.

Further, the compositions were deposited in cylindrical forms and dried at 230° C. over a hot plate. Development of surface and bulk artifacts were monitored and captured, as shown in FIGS. 6A-6D.

As can be seen from FIG. 5, addition of the microspheres and/or carbon-based additive significantly shortened the overall drying time, as well as increased the drying rate. While from FIG. 5 it seems that the combination of microspheres and carbon-based additive (Comp. 4) does not provide significant change in drying rate of a sample that contained carbon black without microspheres (Comp. 3), the significance of the combination of Comp. 4 is clearly evident from FIGS. 6A-6D.

As can be seen in FIGS. 6A-6D, in all of Comps. 1, 2 and 3, significant mechanical artifacts, such as cracks and voids are observable, while in Comp. 4 no such artifacts can be seen under the same drying conditions.

The combination of results of FIG. 5 and FIGS. 6A-6D provides evidence of the careful balance obtained by the combination of porosity controlling additives and energy absorbance/conductance additives in compositions of this disclosure. Utilization of energy absorbance/conductance additives (Comp. 3) increases the absorbance and dissipation of energy, i.e. thermal energy, through the composition-however due to the fast increase in temperature, the liquid components in the composition boil faster and more violently, causing development of internal stresses in the paste during its drying, resulting in significant cracking of the drying paste. Utilization of porosity controlling additives (Comp. 2), while accelerating to some extent the drying process due to formation of evacuation paths for the gaseous products, also causes results in cracking, typically due to capillary collapse during heating without sufficient heat dissipation means.

When combining the microspheres with carbon black (Comp. 4), a balance is obtained between the quick uptake and dissipation of energy within the paste during heating, and the control over the porosity which provides means for controlling the gradual release of gaseous products from the paste during heating. Hence, the development of internal stresses and surface stresses is kept to a minimum, preventing formation of cracks, voids or other surface artifacts that reduce the mechanical stability of the mold region produced from the paste.

It is of note that when the samples were utilized to produce large-scale samples, e.g. of a sample having an area of 100 cm² at a thickness of 4-8 mm, Comp. 1 remained moist even following 30 minutes of heating, while Comp. 4 dried within 6-7 minutes (to a moisture degree of <2%). In other words, in large scale, Comp. 1 showed significantly low mass loss, while Comp. 4 showed a mass loss of over 10 wt % within 6-7 minutes.

The compositions of Table 1-2 have shown similar behavior.

Example 2

The effect on porosity utilizing different porosity was assessed for paste compositions utilizing various porosity controlling additives, as detailed in Table 2. No energy absorbance/conductance additives were used for these samples in order to permit better visualization of porosity artifacts. All samples were dried under the same conditions. Optical microscopy images of cross-sections of the samples are shown in FIGS. 7A-7D.

TABLE 2

Effect of various porosity controlling additives on porosity formation

Figure 7A:
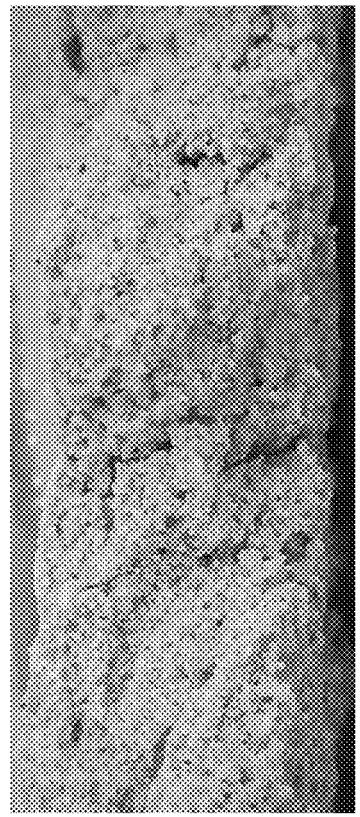
FIGS. 7A-7D are optical microscopy pictures of cross-sections of paste compositions with various porosity controlling additives.
Figure 7B:
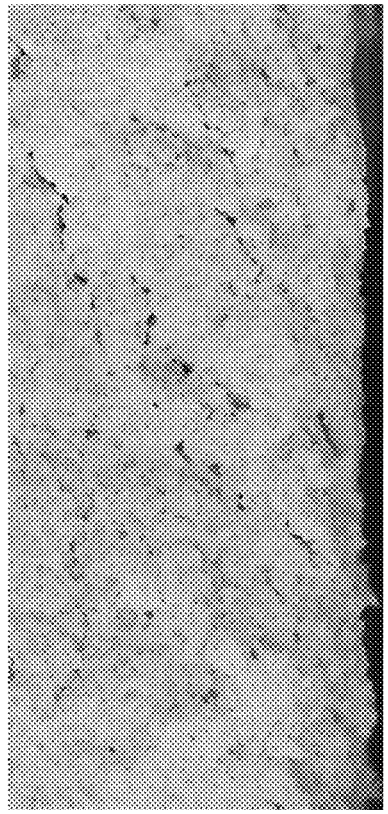
Figure 7C:
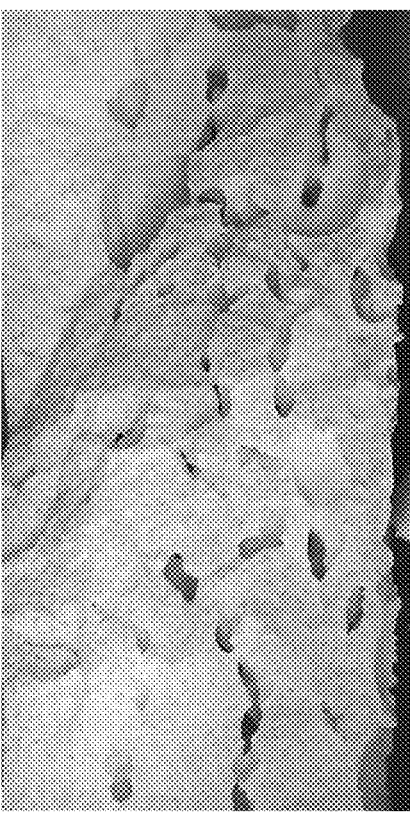
Figure 7D:
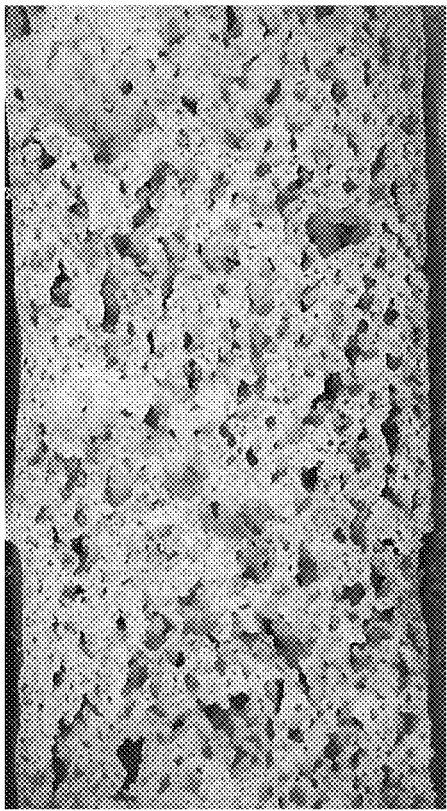

| Sample | Porosity control additive | Porosity formation mechanism |
| --- | --- | --- |
| FIG. 7A | None | Macropores formed during mixing of ingredients and deposition |
| FIG. 7B | Alumina microspheres | Hollow microspheres |
| FIG. 7C | Sodium dodecyl sulfate | Foaming agent |
| FIG. 7D | Poly(diallyldimethylammonium chloride) (PDAC) | Sacrificial organic additive that decomposes during heating |

As can be seen, without addition of porosity controlling additives (FIG. 7A), uneven and uncontrolled macropores form prior to and/or during drying. Such uncontrolled macropores constitute voids in the mold region and are locations for stresses development during drying and thermal cycling, that may eventually cause mechanical failure of the mold.

Addition of microspheres (FIG. 7B), e.g. alumina microspheres, resulted in evenly distributed fine porosity, mainly due to the utilization of substantially monodisperse hollow microspheres that have relatively high mechanical stability.

Foaming agents, such as sodium dodecyl sulfate (SDS) and the like (FIG. 7C), resulted in formation of air bubbles trapped in the paste composition, that collapse to form porosity during heating of the paste. This additive resulted in significant increase in overall porosity, however also to the formation of relatively large pores.

Sacrificial materials undergo at least partial decomposition during heating and drying of the paste. Addition of fine powders of PDAC (FIG. 7D), resulted in finer pores than those obtained with SDS.

It should be noted that the present disclosure is not limited to the production conditions and operational parameters provided in the above-discussed Examples, and the present disclosure may be implemented in various production conditions and operational parameters. The present disclosure is not limited to the casting of gray iron objects and various metals and/or metallic alloys which are suitable for melting and casting, can be used, for example, other iron types, steel and other ferrous alloys, aluminum alloys, copper alloys, nickel alloys, magnesium alloys, and the like.

Aspects of the present disclosure were illustrated with reference to the deposition of the mold material in the form of a solid paste tube with circular cross-section. The present disclosure is not limited by the cross-section of the mold paste as well as by the cross-section shape and dimension of the mold paste.

The invention claimed is:

1. A paste composition for manufacturing of a mold for additive casting of a metal object, in a process of subsequent formation of production layers, each production layer comprising at least one mold region and at least one metal object region, the mold region comprising at least one paste composition, the paste composition comprising:
   between about 65 wt % and about 75 wt % of at least one ceramic material in particulate form;
   between about 3 wt % and about 8 wt % of at least one inorganic binder, wherein said at least one inorganic binder is different from said at least one ceramic material;
   between about 4 wt % and about 14 wt % of at least one porosity controlling additive;
   between about 0.05 wt % and about 3 wt % of at least one of an energy absorbing additive and an energy conductive additive, wherein said energy absorbing additive is different from said at least one ceramic additive and said energy conductive additive is different from said at least one ceramic material, and wherein said energy absorbing additive is different from said energy conductive additive; and
   between about 10 wt % and about 20 wt % of at least one carrier liquid;
   the paste composition having a mass loss of at least about 10 wt % out of the total mass of the paste composition when heated to about 220° C. for a period of time of no more than about 30 minutes;
   wherein said at least one ceramic material comprises a mixture of at least one first ceramic material having a particle size of between about 50 µm and about 300 µm and at least one second ceramic material having a particle size of between about 1 µm and about 15 µm.

2. The paste composition of claim 1, wherein said at least one porosity controlling additive is selected from one or more types of microspheres.

3. The composition of claim 2, wherein said microspheres are made of aluminum oxide, aluminum silicate, silicon dioxide, borosilicate glass, yttria-stabilized zirconia, and mixtures thereof.

4. The composition of claim 2, wherein said microspheres have a particle size of between about 50 μm and about 500 μm.

5. The paste composition of claim 1, wherein said at least one ceramic material is selected from zirconia, alumina, silica, zirconium silicate, yttria-stabilized zirconia, silicon carbide, tungsten carbide, and mixtures thereof.

6. The paste composition of claim 1, wherein said at least one inorganic binder has a polymerization temperature of between about 150° C. and about 850° C.

7. The paste composition of claim 1, wherein said at least one inorganic binder is selected from silicate-based binders, phosphate-based binders, aluminosilicate binders, alumino-silico-phosphate binders, magnesium oxide, colloidal silica, and mixtures thereof.

8. The paste composition of claim 7, wherein said at least one inorganic binder is at least one silicate-based binder.

9. The paste composition of claim 8, wherein said silicate based binder is selected from sodium silicate, potassium silicate, colloidal silica, and mixtures thereof.

10. The paste composition of claim 7, wherein the at least one inorganic binder is at least one phosphate-based binder.

11. The paste composition of claim 10, wherein said phosphate-based binder is selected from alkali metal trimetaphosphate, alkali metal monophosphate, aluminum phosphates, sodium tripolyphosphate, silico-aluminophosphate, monoaluminium phosphate, polyphosphates, dihydrogen aluminophosphate, polyphosphazene and mixtures thereof.

12. The paste composition of claim 1, wherein said energy absorbing additive is selected from carbon powder, carbon black, graphene, graphite, carbon nanotubes, UV-absorbing pigments, visible spectrum absorbing pigments, IR absorbing pigments, magnesium-aluminum oxides, ceramic fibers, and mixtures thereof.

13. The paste composition of claim 1, wherein said energy conductive additive is selected from carbon powder, carbon black, graphene, graphite, carbon nanotubes, boron nitride, carbon nitride, silicon nitride, silicon carbide, metal particles, metal fibers, metal oxides and mixtures thereof.

14. The paste composition of claim 1, wherein the paste composition comprises both said energy absorbing additive and energy conductive additive.

15. The paste composition of claim 1, wherein said at least one liquid carrier is selected from water, $C_1$-$C_6$ alcohols, $C_5$-$C_{12}$ alkanes, mineral oils, natural oil, synthetic oils, and any mixture thereof.

16. The paste composition of claim 1, further comprising at least one surfactant.

17. The paste composition of claim 1, further comprising at least one mechanical reinforcing element.

18. A paste composition for manufacturing of a mold for additive casting of a metal object, in a process of subsequent formation of production layers, each production layer comprising at least one mold region and at least one metal object region, the mold region comprising at least one paste composition, the paste composition comprising:
   between about 65 wt % and about 75 wt % of at least one ceramic material in particulate form;
   between about 3 wt % and about 8 wt % of at least one inorganic binder, wherein said inorganic binder being different from said at least one ceramic material;
   between about 4 wt % and about 14 wt % of at least one porosity controlling additive in the form of microspheres, said microspheres being made of aluminum oxide, aluminum silicate, silicon dioxide, borosilicate glass, yttria-stabilized zirconia, or mixtures thereof;
   between about 0.05 wt % and about 3 wt % of at least one of an energy absorbing additive and an energy conductive additive, wherein said energy absorbing additive is different from said at least one ceramic additive and said energy conductive additive is different from said at least one ceramic material, and wherein said energy absorbing additive is different from said energy conductive additive; and
   between about 10 wt % and about 20 wt % of at least one carrier liquid;
   wherein the paste composition has a mass loss of at least about 10 wt % out of the total mass of the paste composition when heated to about 220° C. for a period of time of no more than about 30 minutes.

19. The paste composition of claim 18, wherein said at least one ceramic material has a particle size of no more than about 300 μm.

20. The paste composition of claim 18, wherein said at least one inorganic binder is selected from the group consisting of silicate-based binders, phosphate-based binders, aluminosilicate binders, alumino-silico-phosphate binders, magnesium oxide, colloidal silica, and mixtures thereof.

* * * * *